US008260650B2

(12) United States Patent
Miller

(10) Patent No.: US 8,260,650 B2
(45) Date of Patent: Sep. 4, 2012

(54) TRANSPORTATION SCHEDULING SYSTEM

(75) Inventor: H. Roy Miller, Toronto (CA)

(73) Assignee: Intelligent IP Corp. (BB)

( * ) Notice: Subject to any disclaimer, the term of this patent is extended or adjusted under 35 U.S.C. 154(b) by 1549 days.

(21) Appl. No.: 11/709,302

(22) Filed: Feb. 21, 2007

(65) Prior Publication Data
US 2007/0214033 A1 Sep. 13, 2007

Related U.S. Application Data

(60) Provisional application No. 60/774,623, filed on Feb. 21, 2006, provisional application No. 60/797,413, filed on May 3, 2006, provisional application No. 60/879,831, filed on Jan. 11, 2007.

(51) Int. Cl.
*G06Q 10/00* (2012.01)
*G06Q 30/00* (2012.01)
(52) U.S. Cl. ................. 705/7.22; 705/7.23; 705/7.25; 705/7.31
(58) Field of Classification Search ............. 705/7.22, 705/7.23, 7.25, 7.31
See application file for complete search history.

(56) References Cited

U.S. PATENT DOCUMENTS

| | | | |
|---|---|---|---|
| 5,253,165 A | 10/1993 | Leiseca et al. | |
| 5,765,122 A | 6/1998 | Nagai et al. | |
| 5,918,209 A * | 6/1999 | Campbell et al. | 705/5 |
| 5,966,126 A | 10/1999 | Szabo | |
| 6,076,067 A | 6/2000 | Jacobs et al. | |
| 6,085,164 A | 7/2000 | Smith et al. | |
| 6,134,500 A | 10/2000 | Tang et al. | |
| 6,263,315 B1 | 7/2001 | Talluri | |
| 6,314,361 B1 | 11/2001 | Yu et al. | |
| 6,321,158 B1 | 11/2001 | DeLorme et al. | |
| 6,385,537 B2 | 5/2002 | Gaspard, II | |
| 6,408,276 B1 | 6/2002 | Yu et al. | |
| 6,578,005 B1 * | 6/2003 | Lesaint et al. | 705/7.14 |
| 6,804,658 B2 | 10/2004 | Lim et al. | |
| 7,010,494 B2 | 3/2006 | Etzioni et al. | |
| 7,110,960 B2 | 9/2006 | Phillips et al. | |
| 7,191,140 B2 | 3/2007 | Yu et al. | |
| 7,707,056 B1 * | 4/2010 | Anbil et al. | 705/7.12 |

(Continued)

OTHER PUBLICATIONS

Yan et al., A Passenger Demand Model for Airline Flight Scheduling and Fleet Routing, Computers & Operation Research 29 (2002) 1559-1581.*

(Continued)

*Primary Examiner* — Kevin Flynn
(74) *Attorney, Agent, or Firm* — Lerner, David, Littenberg, Krumholz & Mentlik, LLP

(57) ABSTRACT

Methods for scheduling a transportation operation such as the operation of an airline. The method desirably selects a demand (100) for transportation specifying an origin, destination, and time of arrival or departure, and selects resources from a database of available resources such as aircraft (508), crew, and departure gates. The resource selection desirably is conducted so as to optimize a result function such as contribution to margin or other financial result from the particular operation specified in the demand. Upon developing a schedule fragment (108), the specified resources are committed, and the database of available resources is modified (110) to indicate that the resources are no longer available at the relevant times. The system then treats another demand and repeats the process so as to develop a full schedule. The system can develop a feasible schedule, even for a complex transportation operation in a brief time, typically in minutes or less. Schedules can be developed using alternative strategies and assumptions, and tested against one another.

46 Claims, 11 Drawing Sheets

U.S. PATENT DOCUMENTS

| | | | |
|---|---|---|---|
| 2002/0065699 A1* | 5/2002 | Talluri | 705/8 |
| 2003/0115093 A1* | 6/2003 | Lim et al. | 705/10 |
| 2003/0191678 A1* | 10/2003 | Shetty et al. | 705/8 |
| 2004/0107110 A1* | 6/2004 | Gottlieb et al. | 705/1 |
| 2004/0199415 A1* | 10/2004 | Ho | 705/8 |
| 2005/0071206 A1* | 3/2005 | Berge | 705/6 |
| 2005/0246208 A1* | 11/2005 | Langerman | 705/5 |

OTHER PUBLICATIONS

Desaulniers et al., Daily Aircraft Routing and Scheduling, Management Science, vol. 43, No. 6, Jun. 1997.*
Applications of Operations Research in the Air Transport Industry.
Operations Research in the Airline Industry.
International Search Report, PCT/US07/18493.

* cited by examiner

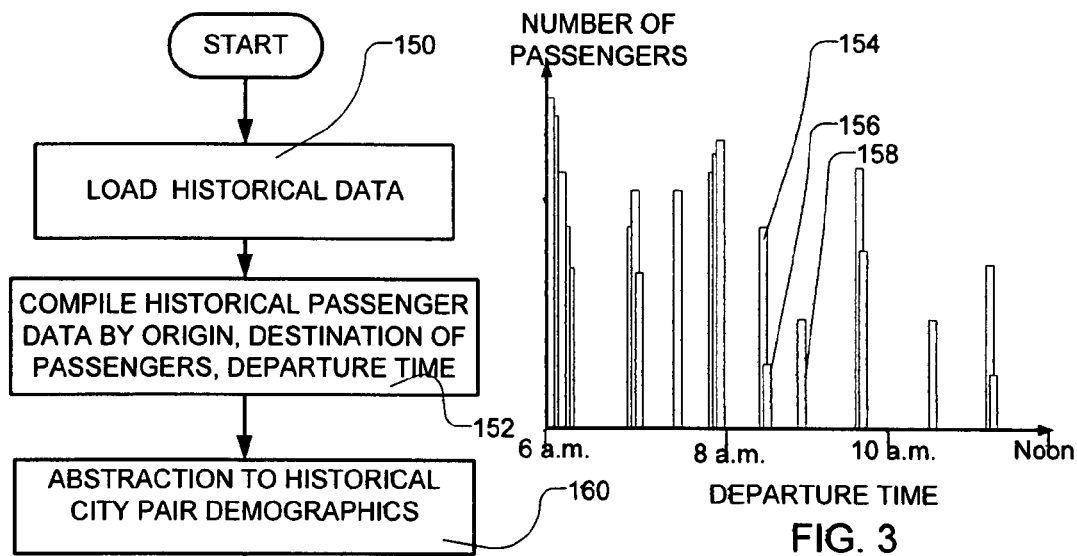
FIG. 2
FIG. 3
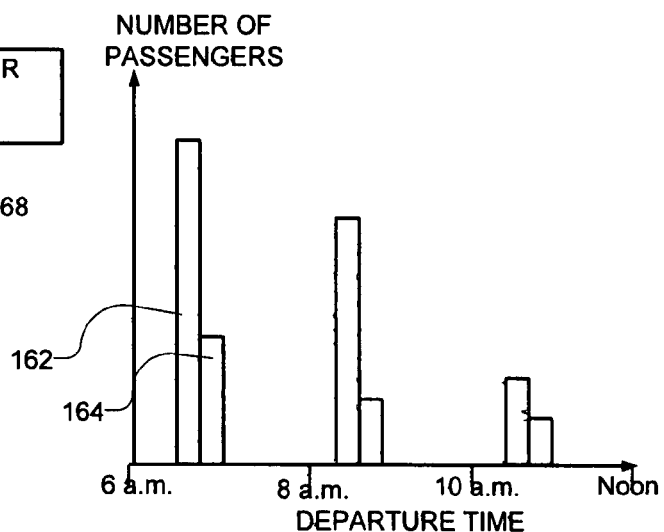
FIG. 4

TRANSPORTATION SCHEDULING SYSTEM

CROSS REFERENCE TO RELATED APPLICATIONS

This application claims the benefit of the filing dates of U.S. Provisional Patent Application Nos. 60/774,623, filed Feb. 21, 2006; 60/797,413, filed May 3, 2006; and 60/879,831, filed Jan. 11, 2007, the disclosures of which are hereby incorporated herein by reference.

FIELD OF THE INVENTION

The present application relates to methods and systems for scheduling transportation operations.

BACKGROUND OF THE INVENTION

Transportation companies such as airlines face daunting problems in setting schedules. A schedule which specifies which vehicles and crew are to make specific trips at specific times must take account of the availability of vehicles to be used in the operation and the crews to operate the vehicles, as well as the availability of fixed resources such as airport gates. Each of these resources typically is governed by complex sets of rules which take account of factors such as the need to set aside times for maintenance of aircraft; the differing qualifications of different pilots and crew member duty time limitations set by government regulations or labor union agreements.

The scheduling system may start with a list of operations, such as a list of flights to be flown at specific times between specific airports, and attempt to find a schedule which will have appropriate aircraft available for all operations, then attempt to schedule the necessary crews, and so on. The process of setting the actual schedule of is generally divorced from the process of determining which routes to fly at which times. This typically leads to sub-optimal use of resources. For example, there typically is no feedback which might lead the airline to recognize that a small change in a departure time of a flight might allow the airline to use an airplane for another flight, so that an airplane sits idle at a cost of thousands of dollars per hour.

It would be desirable to derive an optimized schedule for an airline or other transportation operation, taking into account both financial variables such as the expected revenue from each flight and constraints imposed by resources such as available aircraft. At first consideration, it might seem that one could derive an optimum schedule by applying conventional linear programming techniques to treat all of the variables in the schedule and find the schedule which provides the maximum net financial return. However, it is impossible to determine an optimum schedule for an airline or other transportation company of any size by conventional mathematical techniques. For an airline with 100 airplanes servicing 200 flights per day, even assuming that the flight times are fixed and ignoring the different possible crew arrangements, there are 20,000 possibilities for flying particular aircraft on particular flights the first day. Because the first day's flights reposition the aircraft at different airports, each possibility for the first day yields a different set of 20,000 possibilities for the second day, so that a two-day schedule would include $(20,000)^2$ or 400,000,000 possibilities, and a three-day schedule would include $(20,000)^3$ or 8,000,000,000 possibilities and so on. To select an optimum schedule for a month or two requires examination of an essentially infinite number of possibilities, and is beyond the capability of even the most powerful computers. Stated another way, the problem of deriving an optimum schedule belongs to a class of mathematical problems referred to as "NP-hard," such that the computational load increases exponentially with the number of aircraft, crew and other elements to be accounted for by the schedule.

Despite the considerable effort devoted to the problem of scheduling for airlines and other transportation companies, no truly satisfactory system has been developed heretofore. In particular, it is estimated that using the best current techniques, airlines waste approximately percent of their revenues due to the inefficiencies resulting from poor scheduling. Thus, prior to the present invention, there has been a substantial unmet need for improvement in scheduling.

SUMMARY OF THE INVENTION

One aspect of the invention provides computer-implemented methods of generating schedules for a transportation operation. A method according to this aspect of the invention desirably uses an ordered list of a plurality of demands for transportation between a plurality of origins and a plurality of destinations, each demand being associated with an origin, a destination and a departure or arrival time. The method desirably uses a computer to set a schedule fragment to satisfy one of the demands in the ordered list. The step of setting the schedule fragment including assigning resources from one or more lists of available resources. For example, in the case of an airline, the step of setting a schedule fragment most commonly includes assigning a particular aircraft, crew and airport gate. The method according to this aspect of the invention desirably includes modifying the one or more lists of available resources to indicate a revised state based on the use of resources in the schedule-setting step. The method most preferably also includes the step of repeating the steps of setting a schedule fragment and modifying the lists of available resources that these steps are performed for the plurality of demands according to the order of the demands in the list and so that the step of setting a schedule fragment for each demand is performed using the state resulting from the modifying step for the next previous demand.

Another aspect of the invention provides additional methods of generating schedules for transportation operations. The method according to this aspect of the invention desirably uses a list of a plurality of demands for transportation between a plurality of origins and a plurality of destinations, each demand being associated with an origin, a destination and a departure or arrival time, and also uses one or more lists of vehicles including identities of plurality of vehicles and information specifying location of each vehicle versus time. The method according to this aspect of the invention desirably uses a computer to selecting a vehicle from the one or more vehicles identified in the list of vehicles, selecting one of the demands from the list of the demands and set a schedule fragment to satisfy the selected demands by assigning the selected vehicle to the selected demand. Here again, the method desirably includes modifying the one or more lists of vehicles and list of demands to indicate a revised state based on the use of vehicles and demands in the step of setting a schedule fragment. The method according to this aspect of the invention desirably includes repeating these steps so that the selection and schedule fragment setting steps are performed for the plurality of demands and so that these steps are performed for each repetition using the state resulting from the modifying step of the next previous repetition.

As further discussed below, preferred embodiments of methods according to these aspects of the invention can produce realistic, usable schedules rapidly, even for a complex transportation operation such as a large airline.

Further aspects of the invention provide computer systems and computer programming elements for implementing scheduling methods as discussed above, and transportation systems using such scheduling methods.

BRIEF DESCRIPTION OF THE DRAWINGS

FIG. 2 is a partial flow chart depicting other elements in the method of FIG. 1.

FIG. 3 is a graph presentation of historical passenger loading data.

FIG. 4 is a diagrammatic representation of certain predicted passenger loading data abstracted from the data of FIG. 3.

DETAILED DESCRIPTION

Figure 1:
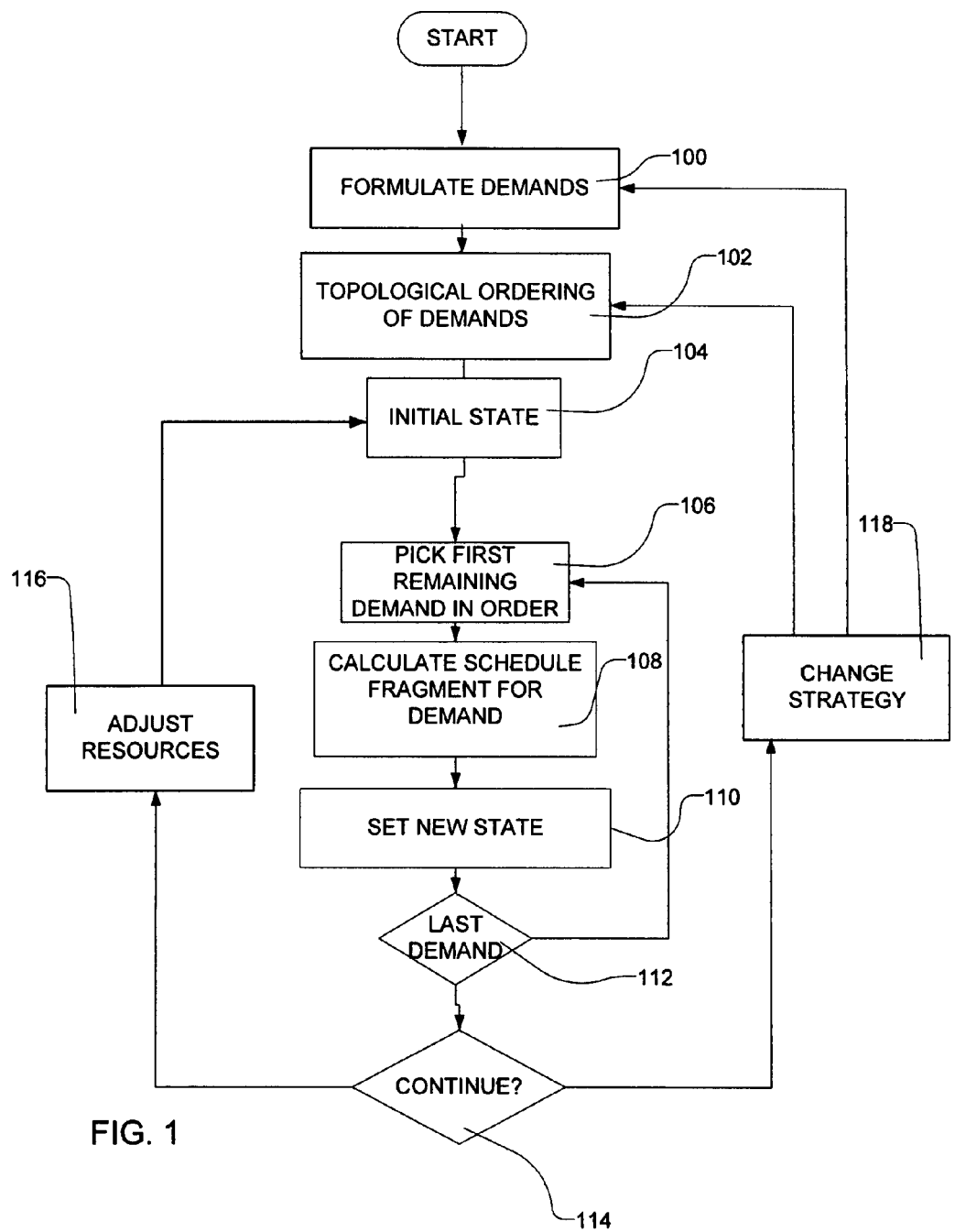
FIG. 1 is a flow chart schematically depicting certain elements in a method according to one embodiment of the invention.

A process according to one embodiment of the present invention is shown in general form in FIG. 1. The process starts by formulating a set of demand nodes, i.e., demands for transportation operations associated with particular dates and times in the future. In the example discussed herein, the demand nodes represent demands for passenger airline flights, but other transportation operations can be treated similarly. In addition to the date, departure time, origin, destination, and expected number of passengers in each class, the data defining each demand node most desirably includes additional data associated with the results to be achieved by meeting the demand, as for example, an ideal contribution to operating margin ("CTM") or other financial result of the airline from an operation meeting the demand using the best possible aircraft at the exact time specified in the demand; expected revenue per passenger in each class of service; an indication as to whether the operation denoted by the demand node serves as a feeder to route traffic to other operations in the system; and other factors discussed below. The system can provide usable results with demand nodes formulated according to any reasonable scheme. However, it is highly desirable to formulate the demands according to a process such as the demand node formulation process further discussed below.

In the next stage 102 of the process, the demands are placed into an order, referred to herein as a "topological", order. This order defines the order in which the demands will be treated by the system in the scheduling operation. The ordering step is performed principally by sorting the demands according to one or more sort keys, each such sort key being based on one or more elements of the data associated with the demand nodes. For example, the demand nodes may be sorted by departure date and time, with or without other factors such as expected contribution to CTM. Alternatively, the origin and destination of the demand nodes may be used as sort keys, so that flights between particular cities are placed higher in the order.

Once the demands have been placed into the order at step 102, the system starts with an assumed initial system state. This system state includes data defining availability of resources which are required to perform the transportation operations. These resources include mobile resources such as aircraft or other vehicles used in the operation; and crew members, as well as fixed resources which may be associated with points of origin or points of destination, as for example, airport gates. The system then treats the demands in order according to the topological ordering assigned at step 102. Thus, at step 106, the system simply picks the first demand at the top of the ordered list, and works with that demand in step 108 to calculate a schedule fragment for that particular demand. The process of calculating the schedule fragment involves selection of resources to be applied to meeting the demand in such a way as to produce a feasible result, and desirably, the best attainable result given the state of the system. For example, the system may seek to select a particular aircraft and crew which will yield the best operating result, such as the best CTM, for the particular segment. It should be appreciated that optimization of the schedule fragment for a particular operation is a relatively simple problem; the number of possibilities for a given demand node is bounded by the number of available resources in the system, and does not grow with the number of demand nodes. The process of calculating the schedule fragments may include adaptation. As discussed below, the term "adaptation" as used herein refers to adjustment of the initial assumptions applied in a selection or optimization process. For example, while a demand may specify a flight departing from Cleveland at 6:00 p.m. with capacity for 150 passengers, the process of setting a schedule fragment includes examining the results which could be achieved by departing at slightly later times, or with a smaller aircraft, or both.

Once the system has selected a feasible and, most preferably, optimum set of resources to be applied to the particular demand under consideration, resources are committed to the particular demand being treated. This results in setting a new system state at step 110. Thus, the list of which aircraft are available at which times is modified to indicate that the aircraft assigned to the demand treated in step 108 can no longer be considered available on the date and time considered in step 108. Similarly, the crew members assigned to the particular demand treated in step 108 will no longer be available, and so on. The system then cycles back to step 106, whereupon the system treats the next demand now at the top of the list. Thus, in each cycle, the system considers one demand and tries to find a feasible set of resources for that demand, and most desirably, an optimal set of resources. This process continues until all of the demand nodes have been processed, at step 112.

As stated above, during calculation of the schedule fragment for each demand, the system evaluates a result function, most often a financial result such as CTM associated with the set of resources assigned to meet the demand node. The system also records this result as the expected result for the schedule fragment and aggregates this result with the results associated with all other previously calculated schedule fragments to yield an aggregate expected result, such as aggregate CTM for the schedule as a whole. The expected result such as CTM at this stage of the operation is more accurate than the ideal CTM of the original demand node. The expected result after calculation of the schedule fragment reflects results which can be achieved with the available resources. In some cases, the system may not be able to find a feasible set of resources, and in that case, may return a result indicating that the demand will not be met. The system also can keep track of these instances.

When the system has processed the last demand at step 112, the system has developed a full schedule defining allocations to resources for all of the demands, or at least that subset which can be served by the available resources and which are not excluded by other criteria discussed below. The number of calculations to be performed in a complete cycle through steps 106-112 to produce a complete schedule is limited and does not increase exponentially with the size of the operation to be scheduled. All of the calculations required to complete a full schedule can be performed in a few minutes or less on a conventional personal computer programmed to perform the operations discussed herein. Because the scheduling operation can be performed rapidly, the assumptions used in developing a schedule can be changed, and the scheduling process can be repeated. As indicated at step 114, the computer system or a manual operator may observe the aggregate result from the scheduling operation, for example, by evaluating the aggregate CTM, the numbers of demands which are not met or the like, and make a decision to repeat the scheduling process. That decision may include a decision at step 116 to adjust the level of resources made available for the scheduling operation, as for example, the number of aircraft or crews, and repeat the scheduling operation starting at step 104 and continuing until the whole additional schedule has been completed.

Because it is feasible to calculate schedules rapidly, this cycle can be repeated over and over again, until an optimum level of resources which returns the best result, such as the highest CTM or the fewest demands not met, is found. Alternatively or additionally, the system or a manual operator may instruct the system to change either the assumptions used in formulating the demands in step 100, or the sorting order applied in the topological ordering step 102. For example, the scheduling system may be used in conjunction with a revenue prediction module which applies a game theory to test various fare levels, levels or ancillary services (e.g., a baggage allowance or meal service associated with a flight) or other factors versus known information concerning competition. Different assumptions applied in the game theory yield different estimates of market share and hence different numbers of expected passengers and different expected revenue per passenger in the demand nodes. In the change strategy step 118, the game theory system (not shown) may be instructed to try a different assumption concerning fares to be charged or services to be offered by the airline using the scheduling system and the responses of competitors to those fares, and which results in different predictions of passenger loading, and hence different demands at step 100. Different estimates of market share may be applied to various portions of the demand calculations as, for example, different market shares along routes served by different competitors. The sort keys and sorting order applied in the topological ordering step 102 also may be varied. Thus, essentially any element of the strategy used by the airline can be changed. Here again, because the scheduling system can generate a complete schedule for months of operation in a few minutes, it is feasible to calculate schedules for numerous strategic assumptions, and thus find the best strategic assumptions.

A process for formulating the demands (step 100 of FIG. 1) is shown in greater detail in FIGS. 2-9. The process begins by loading historical data describing sales of tickets by all carriers serving the cities to be served by the airline. This passenger data typically is provided in the form of passenger name records or "PNRs," each of which reflects travel by an individual passenger. Each PNR typically reflects the passenger's origin and destination; the price paid for transportation between the origin and destination; the class of service as defined by the carrier which carried the passenger. PNR data is commercially available within the airline industry. Desirably, at least one year of historical data is used.

In the next stage 152 of the process, the system compiles historical data for each pair of origin and destination cities. The system may make separate compilations for different sets of days during the period treated. For example, the system may compile a set of data for each origin and destination with respect to all weekdays; or alternatively, a set of data for all Mondays during the historical period in question, another set of data for all Tuesdays during the same period, and so on. Each historical period desirably is less than a full year as, for example, a month, so that sets of data compiled for different periods such as different months can be compared with one another to detect patterns of seasonal variation. Also, sets of data compiled for different historical periods can be compared with one another to detect growth trends in travel between particular origin and destination cities. For example, if more than one year's worth of data is available, the number of passengers carried between the particular origin city and destination city on weekdays in February of the latest year can be compared with the comparable number for February of the prior year to derive an estimate of year-to-year growth. The compilation for each set of days during the historical period includes data concerning the number of passengers departing at each particular departure time in each class of service offered by the various carriers serving the cities during the historical period in question, and also includes data about the average fare paid by passengers for each such class of service.

The departure time data reflects passenger behavior with the schedules offered by the airlines serving the origin and destination during the historical period in question. This data is depicted graphically in FIG. 3. For example, bar 154 represents the number of passengers traveling in economy class on a flight of airline A departing at 8:30 a.m., whereas bar 156 represents the average number of passengers carried in first class on the same flight of airline A, whereas bar 158 represents the average number of passengers carried on a single class flight of airline B departing at 8:45 a.m.

In a further step 160 of the process, the historical information is abstracted by lumping together the passengers departing during a defined time interval referred to herein as a window, as for example, a particular one-hour or two-hour window during the day, and the classes of service offered by the various airlines are mapped to the most nearly comparable classes of service to be offered by the airline being scheduled. The system thus forms a historical city-pair demographic for each class of the airline being schedule for each window. For example, as shown graphically in FIG. 4, bar 162 represents the average number of passengers who departed from the particular origin for the particular destination on an average weekday and purchased tickets in classes of service on all carriers corresponding roughly to the economy class of the carrier being scheduled. Similarly, bar 164 represents the average number of passengers for first class during the same window on an average weekday. Although the compilation and abstraction processes 152 and 160 are shown as separate processes for clarity of illustration, these processes may overlap. For example, as each PNR record is examined, the class of service may be translated from the class of service of the carrier actually used to the average class of service of the carrier being scheduled.

In effect, each window represents a market of potential passengers which is distinct, to some extent, from the market represented by other windows during the day. The sizes of the windows may be varied for different city pairs by manual or automatic selection depending on factors such as the number of flights serving the city pair. For example, where two cities are connected by only two flights per day, the window size may be 12 hours; where cities are connected by dozens of flights per day (such as New York and Chicago), the window size may be less than an hour.

The system may assign an arbitrary departure time within the window used in the abstraction process, as for example, the center of the window. More preferably, the system computes the mean departure time of the passengers included in the demographic based on the historical departure times incorporated into the demographic, and assigns that mean time as the departure time of the city pair demographic. The system may also obtain a measure of the time variance in the demographic, i.e., a measure of the relationship between time within the window and number of passengers.

The system also computes an average historical fare in terms of the classes of service to be offered by the carrier being scheduled. Thus, as the class of travel for each passenger name record is matched to a comparable class on the carrier being scheduled, a historical fare paid by the passenger in question is taken as a fare which the same passenger would have paid for travel in the comparable class in the carrier being scheduled. These fares are averaged over all of the passengers included in the demographic to yield an average historical fare associated with the class and window.

Thus, at the conclusion of the compilation and abstraction processes, the system has a set of historical city-pair demographics for each pair of origin and destination cities. Each such historical city pair demographic includes a departure time, a number of passengers, and an average fare for each class of service of the carrier being scheduled, and may include additional data such as a measure of variance in the departure time.

These historical city pair demographics are then converted to predicted city pair demographics in a further step 168 of the process. As discussed above, the historical demographic for each city pair represents passengers carried by all carriers. The number of passengers in each historical city pair demographic is multiplied by a predicted market share for the airline being scheduled in the particular market represented by the demographic. For example, if the historical city pair demographic indicates that 600 coach-class passengers and 100 first-class passengers depart from Seattle for New York on an average weekday between 6:00 p.m. and 8:00 p.m., and the estimated share of market achieved by the carrier being scheduled is 20%, then the predicted city pair demographic will indicate that the airline may expect 120 coach-class passengers and 20 first-class passengers. Similarly, a growth factor may be applied to take account of year-to-year increase (or decrease) in traffic between the origin and destination cities. Further, a predicted average fare for each class of service which the airline will realize is included in each predicted city pair demographic. The prediction of market share as a function of average fare can be made intuitively, but preferably is made by applying techniques such as game theory which account for competitive behaviors in the marketplace. Alternatively, historic market share and historic fare data can be used, based on the assumption that none of the airlines serving the market will change its pricing strategy.

Figure 5:
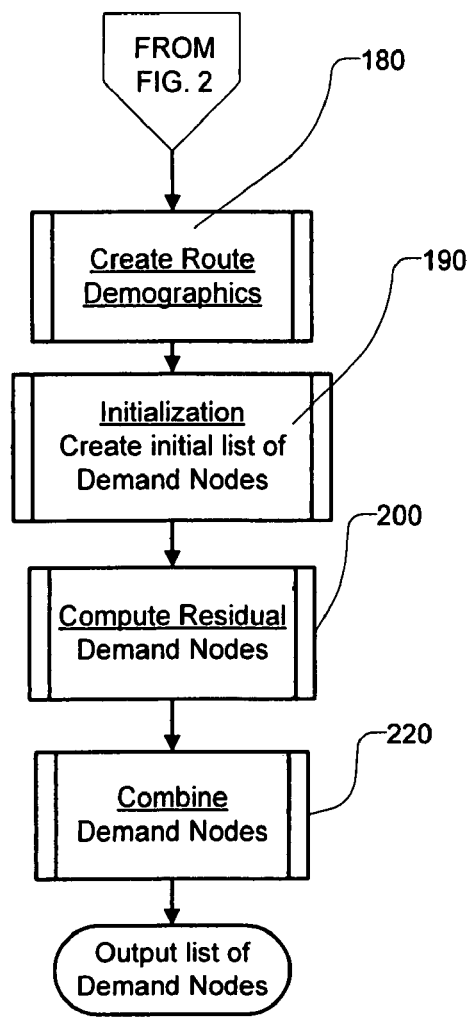
FIG. 5 is a partial flow chart depicting further steps of the method shown in FIGS. 1 and 2.
Figure 6:
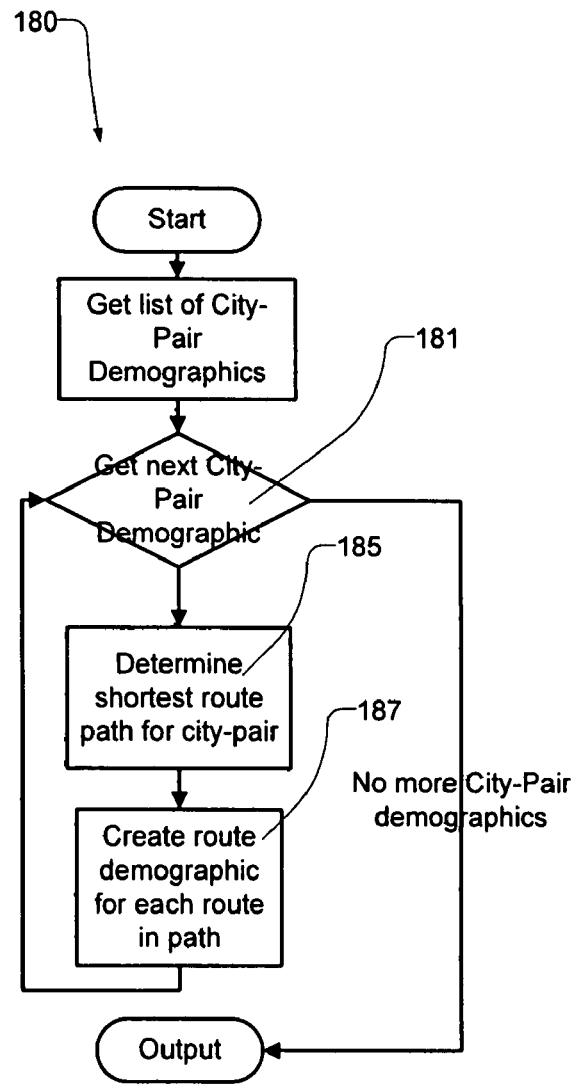
FIG. 6 is another partial flow chart depicting one of the steps of FIG. 5 in greater detail.

The predicted city pair demographics resulting from step 168 are converted to demand nodes, i.e., individual demands for transportation between origins and destinations along routes served by the airline being scheduled by the process shown in overview in FIG. 5. In the first step 180 of this process, each city pair demographic is converted to a route demographic by steps shown in greater detail in FIG. 6. The process of FIG. 6 assumes that the airline has determined which city pairs will be served by direct, nonstop flights between cities, and hence has a list of directly connected cities. Each pair of directly connected cities is referred to herein as a "route." The system gets a list of city pair demographics and then treats each city pair demographic in order. At step 185, the system selects the shortest path through all of the available routes which connect the origin city of the city pair demographic with the destination city. For example, the system may examine all of the routes which have their origins at the origin city of the city pair demographic and determine if any of those routes have their destinations at the destination city of the city pair demographic. If so, that route is a direct, nonstop route, and hence, is shortest. If not, the system may examine the destination city of each route having its origin at the origin city of the city pair demographic and select a set of cities which constitute the destination cities of those routes. The system may then consider each such destination in turn, and see if there is a route having its origin at such destination city and its destination at the destination of the city pair demographic. If so, the system records the aggregate length combination of two routes and continues such examination until all such combinations of two routes have been found. The system then considers the available combinations of two routes and selects the combination which has the smallest total length. If no two-route combination is found, the system may then search for a three-route combination in a directly analogous manner.

In a variant of this approach, the system may treat certain cities as hub cities, so that if there is no direct, single route path, the system will seek to construct two-route and three-route paths using flights passing through hub cities. This greatly reduces the number of possibilities to be considered in formulation of two-route and three-route paths.

In a further variant, the system may exclude routes running in the wrong direction from the origin city or from a hub city, i.e., routes for which the destination city of the route is further from the destination city of the city pair demographic than the origin city of the route. This further limits the number of routes to be considered in finding two-route and three-route paths. The length of each route considered in this process may be the actual geographic mileage between the cities, or may be a score based on geographic mileage and other factors such as landing fees or congestion at particular airports.

Once the system has found the shortest route path for a particular city pair demographic, the system creates a route demographic for each route in this shortest path at steps 187. If the shortest route happens to be a single-route path, i.e., a direct, nonstop route, then the route demographic is identical to the original city pair demographic. However, if the path is a multi-route path, the system constructs a first route demographic having its origin at the origin city of the city pair demographic, having destination as the destination of the first route, and having a departure time as the departure time of the city pair demographic. The expected revenue per passenger for the first route demographic is a portion of the expected revenue per passenger. The proportion of expected revenue may be done on the basis of route length, i.e., the expected revenue for the first route may be the expected revenue for the city pair demographic divided by the total length of all routes in the path and multiplied by the length of the first route itself. The system also creates a route demographic for the second route in the path. This route demographic has its departure city as the destination city of the first route, its destination city as the destination city of the second route, and its departure time equal to the departure time of the city pair demographic, plus the expected flying time along the first route and an allowance for transfer time. Here again, the expected revenue for the second route is a portion of the expected revenue per passenger for the city pair demographic as a whole, calculated by length as discussed above for the first route. In the case of a multi-route path, the route demographic for each route in the path may be annotated to indicate that the route is either a feeder route (where there is a subsequent route in the path), or a recipient route (where there is a previous route in the path), or both.

Once route demographics have been set for all of the routes in the path, the system returns to step 181 and repeats the process of steps 185 and 187 for the next city pair demographic, until all city pair demographics have been treated and converted to route demographics. Each route demographic identifies its dates of applicability in the same manner as a city pair demographic. For example, a route demographic derived from a city pair demographic applicable only to Mondays in February would, likewise, also be applicable only to Mondays in February.

After the route demographics have been formed, they are used in the next step 190 of the process shown in FIG. 5 to create an initial list of demand nodes. Each route is taken in turn. For each route, a list of route demographics having origin and destination corresponding to the route in question is compiled from the route demographics formed in step 180. The list of route demographics for each route is converted into a set of demand nodes for each day of applicability of the route demographic in question. For example, a route demographic applicable to Mondays in February would be converted into a demand node for the date corresponding to the first Monday in February, another demand node for the date corresponding to the second Monday in February, and so on. The system can also take account of a priori or intuitive knowledge available to the operator. For example, if historical data is compiled for weekday flights, and the operator is aware that a particular date will be a religious holiday at the origin or destination, the system can reduce the expected number of passengers for that particular date. After all route demographics corresponding to a particular route have been processed, the system picks the next route and processes the route demographics for that route in the same way. This process continues until all of the route demographics for all of the routes have been processed. At this point, there is an initial list of demand nodes for each route. Each such demand node includes all of the characteristics of the route demographic, such as the origin, the destination, a departure date and time, an expected revenue per passenger for each class, and an expected number of passengers in each class.

Figure 7:
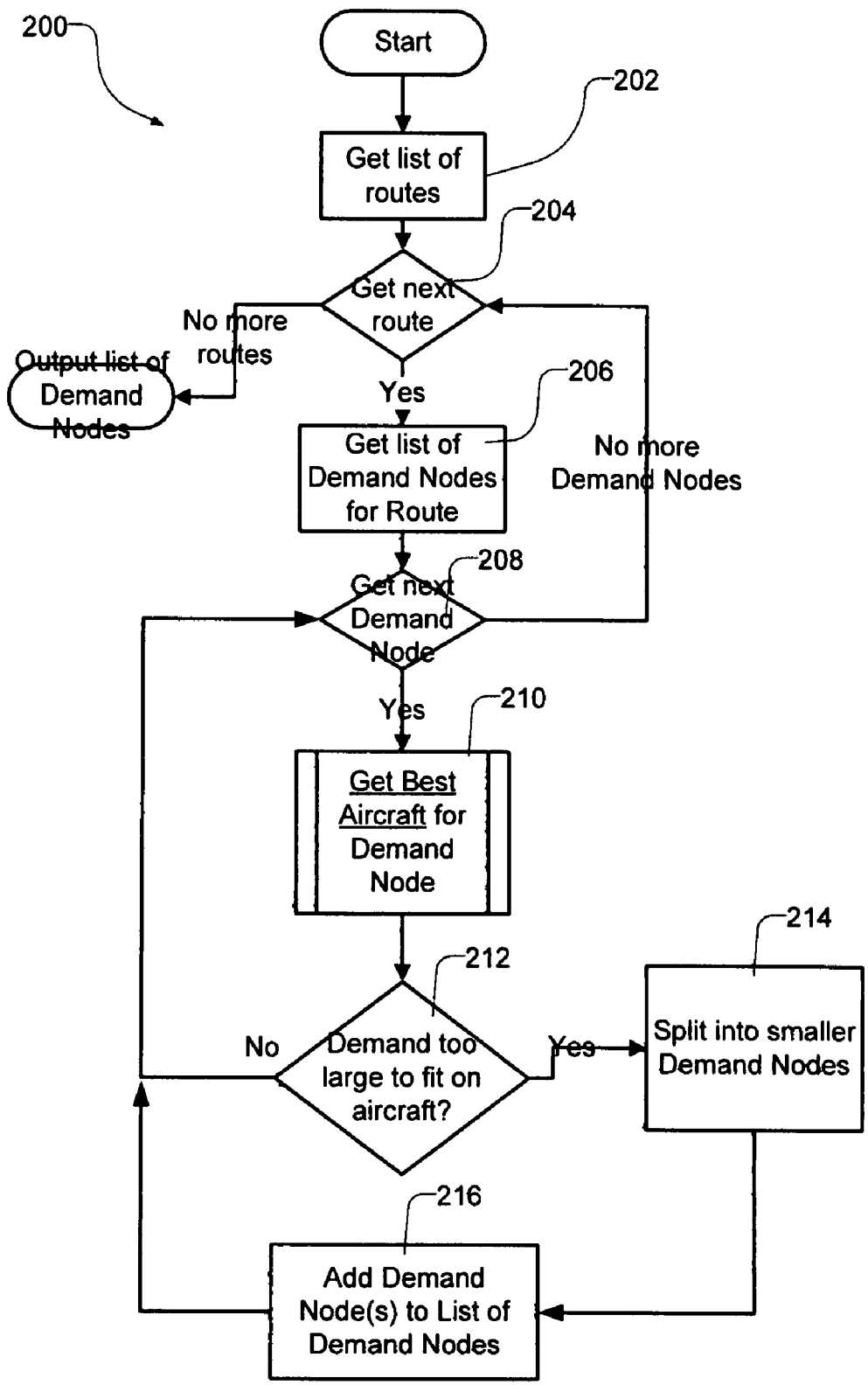
FIG. 7 is a further partial flow chart depicting another step shown in FIG. 5 in greater detail.

In the next stage 200 of the process, the system examines the demand nodes in the initial list as shown in greater detail in FIG. 7. This examination begins with a list of routes at step 202, and gets each route in turn at step 204. For each route, the system obtains the list of demand nodes for the route at step 206. This list need not be in any particular order. Once the list of demand nodes for a particular route has been retrieved, the system starts with a first demand node in the list. The system takes the first demand node in the list at step 208 and processes the demand node to select the best aircraft for use in a flight meeting that demand node, i.e., a flight from the origin to the destination with the expected number of passengers. The system examines all of the aircraft types used by the airline being scheduled, and selects the type of aircraft which, if flown from the origin to the destination city with the number of passengers specified in the demand node, will yield the largest contribution to margin. At this stage of the process, the selection of a "best" aircraft type is made without consideration of whether an aircraft of this type will actually be available at the time and date specified by the demand node, and without consideration of costs which might be incurred in making the aircraft available at such time and date, as for example, ferrying the aircraft from a distant location. Thus, the contribution to margin characterized in this stage of the process presents an upper bound on the return to be expected from meeting the demand node.

In the next stage 212 of the process, the system compares the number of passengers specified in the demand node against the number of passengers which can be carried by the best aircraft selected at step 210. If the number of passengers specified in the demand node is less than or equal to the capacity of the selected best aircraft, the system marks the demand node as processed, annotates the demand node with an expected contribution to margin, and returns to step 208 to process the next demand node. However, if the number of passengers specified in the demand node is greater than the carrying capacity of the selected best aircraft, the system erases the original demand node from the list and splits the demand node into two smaller demand nodes at step 214 and adds these smaller demand nodes to the list of demand nodes for the route, whereupon the system again returns to step 208 to get the next unprocessed demand node. One of the new smaller demand nodes may constitute the next demand node to be processed. The smaller demand nodes created from a large demand node are identical to the original demand node, but each of the new smaller demand nodes has one-half of the number of passengers specified in the original demand node. The additional demand nodes have the same departure time as the original demand node. The additional demand nodes are processed in the same manner as the other demand nodes in the list. Thus, a very large demand node may be split into two demand nodes on the first pass through step 212. When each of these smaller demand nodes is processed, one or more may be split again into still smaller demand nodes. Also, when such a split, smaller demand node is processed at step 210, the best aircraft selected for that demand node may be different from the best aircraft selected for the original large demand node.

The process continues in this manner until all of the demand nodes for the route (including any smaller demand nodes resulting from splitting at step 214) have been processed, whereupon the system gets the next route at step 204 and the list of demand nodes associated with the new route, and repeats the same process. This continues until all of the routes have been processed in the same manner.

Figure 8:
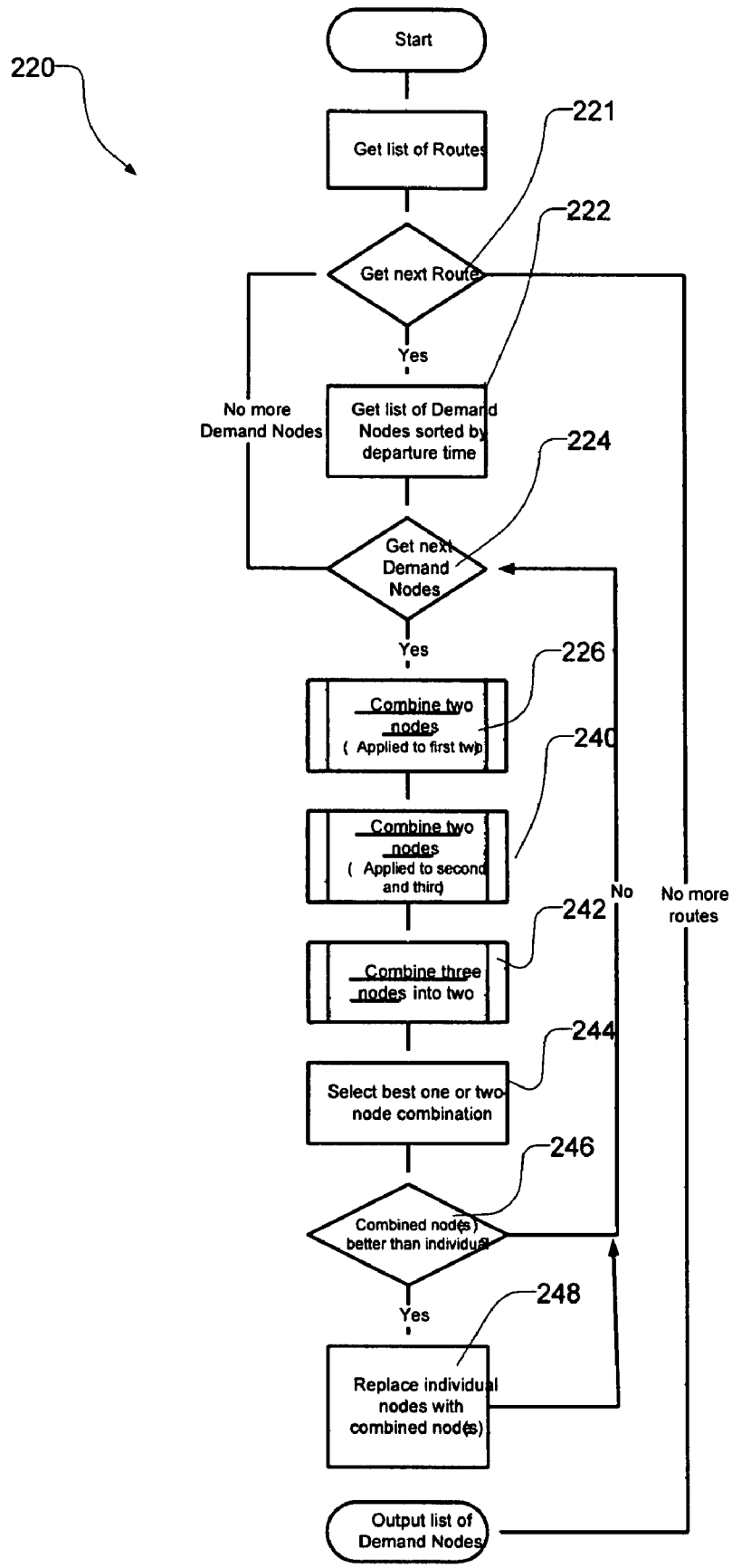
FIG. 8 is yet another partial flow chart depicting a further step shown in FIG. 5 in greater detail.

The resulting output list of demand nodes is passed to a further step 220 (FIGS. 5 and 8). In this step, the system examines the list of demand nodes for each route and determines whether a better expected CTM can be found by combining demand nodes with one another. This step selects a particular route from the list of routes and sorts all of the demand nodes from step 200 (FIG. 5) by departure time. At step 224 of step 220 (FIG. 8), the system selects a set of the three earliest demand nodes in the sorted list. The system then attempts in step 226 to create a combined node from the first two of the three selected nodes.

This process computes a range of times for each of the two demand nodes. This range of time for each demand node is based on an estimate of the manner in which passenger loading will vary with time if a flight is shifted in time from the time specified in the demand node. As represented graphically in FIG. 9, the variance in passenger load with departure time for a demand node 250 may be represented by a step function shown by the cross-hatched bars. The step function has its maximum value $N_{250}$, equal to the number of passengers in the demand node, at the original departure time $T_{250}$ of the demand node, and having progressively lower values for earlier and later departure times. The significance range for the demand node may be taken as the earliest and latest time for which the step function has a value greater than some arbitrary number of passengers. The step function may be based on an overall assumption for the system as a whole, or alternatively, may be selected based on a priori knowledge associated with particular routes. For example, demand nodes serving known business destinations such as New York City or Washington, D.C. may be assigned a narrow, steeply declining step function to reflect an assumption that business travelers generally are on a tightly constrained schedule, whereas demand nodes having a destination or origin at a resort location such as Orlando, Fla., may be assigned a considerably broader variance based on the assumption that vacation travelers are relatively insensitive to schedule.

In yet another embodiment, an estimate of the variance of passenger load with departure time may be obtained from the historical data used to generate the historical passenger data and city pair demographics. For example, if the historical passenger data shows substantially equal numbers of passengers departing at many different times, widely spaced around the mid-point of the window used in the abstraction process (step 150), the city pair demographic may be assigned a large variance, and this variance may be assigned to each route demographic derived from such city pair demographic in step 180 and carried forward into each demand node created from the route demographic. Additionally, the variance for a particular demand node may be single-sided or asymmetrical about the departure time of the demand node. For example, if a particular demand node is annotated with an indication that this demand node is derived from a route demographic which represents the second or subsequent route demographic in a multi-path route (step 180), the variance or step function can be arranged to decline gradually for departure times after the original departure time of the demand mode, but may drop abruptly to zero passengers for all departure times prior to the original departure time of the demand node, reflecting the reality that if a connecting flight departs early, the passengers from the earlier flight in the path will not be available.

The function relating number of passengers to time for each demand node has a range of significance bounded by the earliest and latest times at which any appreciable number of the passengers represented by the demand node would be willing to travel along the route. For example, the step function for demand node 250 has a significance range from time $T_{250E}$ to time $T_{250L}$. Another demand node 252 having departure time $T_{250}$ has a variance function represented by unshaded bars in FIG. 9, with a significance range from $T_{252E}$ to $T_{252L}$. The system examines the significance ranges of the two demand nodes and determines if the significance ranges overlap. If they do not overlap, the attempt to combine these two demand nodes is abandoned, and step 226 is complete. However, if these significance ranges overlap, the system selects a set of possible departure times for a combined demand node. The earliest possible departure time is either the earliest time in the range of times encompassed by the overlapping significance ranges, or the original departure time of the earlier demand node, whichever is later. The latest possible departure time is the latest time encompassed by the overlapping significance ranges of the two demand nodes, or the departure time of the later demand node, whichever is earlier. For example, the significance ranges of demand nodes 250 and 252 overlap from time $T_{252E}$ to time $T_{250L}$. Thus, the earliest possible departure time for a combined node would be $T_{252E}$ and the latest possible departure time would be $T_{250L}$. In reality, overlapping significance ranges for two demand nodes on the same route and same day indicate that a flight along the route departing during the range of overlap would attract some passengers associated with the earlier demand node and some passengers associated with the later demand node. The system also calculates one or more intermediate possible departure times between earliest and latest possible departure times. For example, the system may calculate one such intermediate departure time as the mid-point between the earliest and latest possible departure times.

Figure 9:
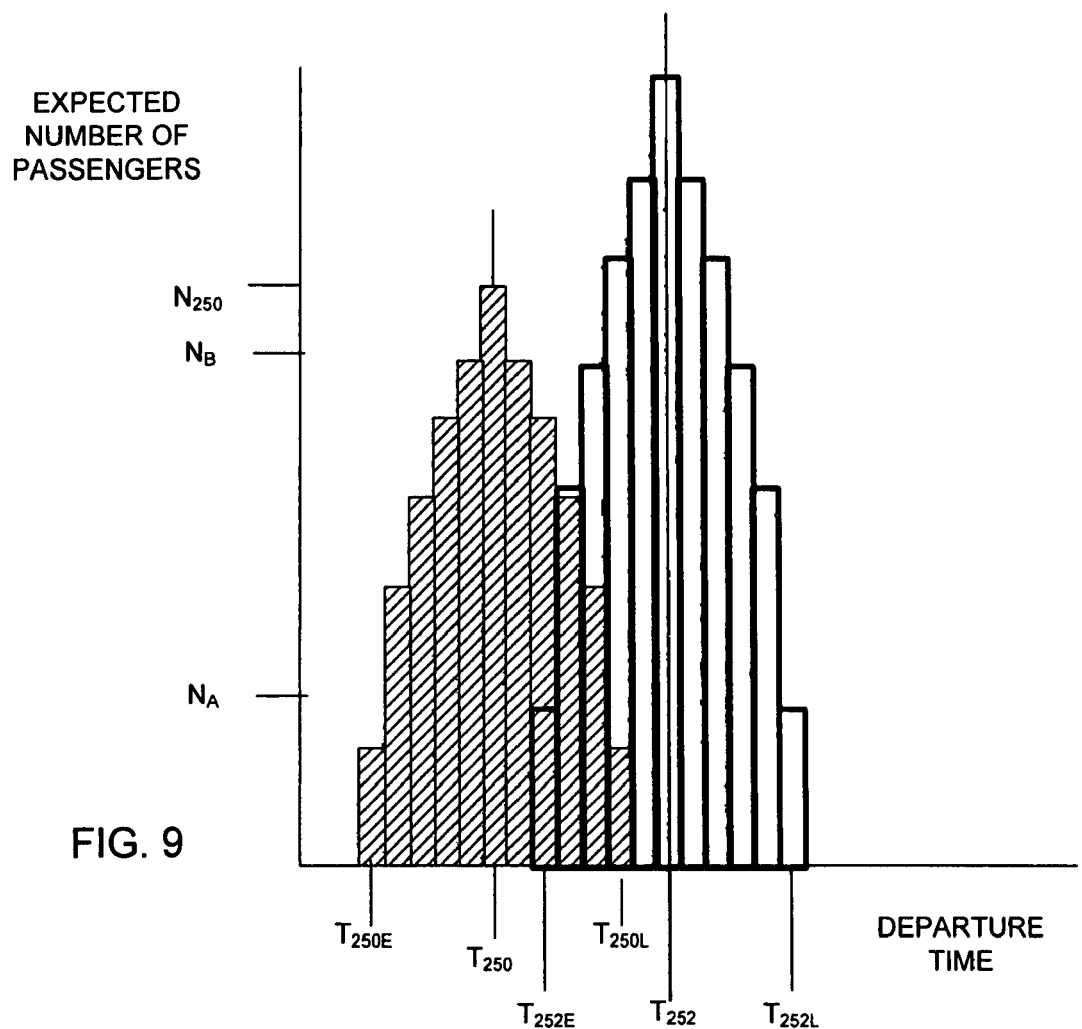
FIG. 9 is a diagrammatic graph of expected passenger loading versus departure time.

For each possible departure time, the system determines the number of passengers expected for such departure time. The system evaluates the step function for each demand node at the possible departure time and adds the value of the step functions for both demand nodes for the particular departure time to yield an expected number of passengers for a combined node operating at that possible departure time. For example, the expected number of passengers for a flight departing at time $T_{252E}$ is the sum of $N_A$ and $N_B$ (FIG. 9).

The system then calculates the best aircraft for the demand node at each possible departure time and calculates the CTM for that possible departure time. In the combining step, if the expected number of passengers exceeds the capacity of the best aircraft, the expected number of passengers is set equal to the capacity of the aircraft. The system compares the CTMs for the possible departure times and selects the best one as the result of combining the first two demand nodes, whereupon step 226 terminates. The system then attempts to combine the second two demand nodes at step 240 in exactly the same manner and attempts to combine all three of the selected demand nodes at step 242. The process of combining three demand nodes may assume that these demand nodes are to be combined into two demand nodes having two different departure times, and uses a plurality of possible departure times within the range from the departure time of the earliest or first demand node to the departure time of the latest or third demand node and calculates combined passenger loading at each possible departure time based on the step functions of the three selected demands, and once again selects the best aircraft and computes CTMs for the best aircraft for each possible departure time. The best aggregate CTM for the two demand nodes is output as the result of step 242.

At step 244, the system compares the CTMs resulting from the two-node combinations of steps 226 and 240 and the three-node combination of step 242, and picks the best of these CTMs and outputs a result including the possible departure time, the expected CTM for the combined nodes, and the identity of the nodes which will combine to yield the combined nodes, i.e., the first two, the second two, or all three of the nodes considered. At step 246, the system compares the CTM for the combined node output by step 244 with the sum of the CTMs for the individual nodes which were used to form the combined node. If the combined nodes yields CTM higher than the sum of the CTMs for the individual modes, the system branches to step 248 and replaces the individual nodes used to form the combined output node with the combined node or nodes, and then returns to step 224. If not, the system returns directly to step 244 without replacing the individual nodes. At step 224, the system gets another set of three demand nodes, including the latest demand node in the set previously processed and the two succeeding demand nodes. The system then treats this new set of demand nodes in the same manner. This continues until there are not more demand nodes to be processed, whereupon the system branches back to step 221 and selects the next route, which is processed in the same manner. This continues until all of the routes have been processed.

In this combination process, the system may reverse some of the splits made at substep 214 (FIG. 7) of the residual demand process 200. For example, if a very large demand node was split into two demand nodes, the two demand nodes may be combined back again into a larger demand node at step 226 or step 240.

At this point in the process, the step of formulating demands (step 100 in FIG. 1) is complete. The system then places the demand nodes into an order, referred to herein as a topological order. This is done by sorting the demands according to one or more sort keys. A sort key may include any characteristics of the demands. One simple sort key consists of the date and departure time specified in the demands, so that the demands are placed in chronological order. However, other sort keys may be used, as for example, sorting by expected CTMs, so that the most profitable flights are first in the topological order, or sorting by length of routes, so that the long-haul demands are scheduled first or so that short-haul demands are scheduled first. Also, an airline may wish to give priority to flights between designated hub cities so that demand nodes having hub cities as origin and destination cities are treated first. As noted above, a route demand may be marked as a feeder route demand of a multi-route path, and the demand nodes resulting from the feeder route demand are similarly marked. This marker may be used a sort key so that feeder demand nodes are treated first. In a further variant, these and other characteristics of demand nodes may be assigned weighting factors, and a composite sort key may be calculated based on plural characteristics of each demand node, weighted by such factors. The choice of sort key will influence the results achieved in scheduling to some degree. However, in practice, it has been found that simply sorting by departure date and time works as well or nearly as well as more complex schemes.

The system maintains a database of the resources needed to perform the operations to be schedule. For an airline, these resources include airplanes and crew members, both of which are mobile, as well as passenger loading gates at particular airports. The database includes information about the characteristics of each resource, and also contains information concerning the status of each resource at each time in the future during the duration of the schedule being generated. For an airplane, the characteristics typically will include the type of airplane; its seat capacity in each class of service; its maximum range (which may be stated as a maximum block time); and the cost of using the airplane, typically stated as a cost per flying hour. The status information for an airplane for each time in the schedule would include location, as for example, parked at a particular airport or en route; an indication as to whether the airplane is out of service for maintenance; and information about the operating history of the airplane, such as the number of operating hours and calendar days since last scheduled maintenance check and since last major overhaul. For a crew member, characteristics would include qualifications to serve on particular types of aircraft and home base. The status information for each time would include information such as whether the crew member is on-duty or off-duty; the location of the crew member at his home base, or at some other airport, or en route; and the number of hours or flights since the crew member came on duty, the number of hours of duty time accumulated in each month and year, and any other data pertinent to calculation of the crew member's availability for flights under pertinent government regulations, union contracts, or airline personnel policies. The characteristics of a gate include identification of an airport where the gate is located, and may also include types of aircraft which can be accommodated at particular gates. A gate also may have associated with it an occupancy cost such as may be imposed for late departure of an airplane. The status for a gate typically is simply an indication of whether the gate is occupied or unoccupied at each interval during the schedule.

The database is set to an initial state which represents the expected state of the various resources at the beginning of the schedule.

The system takes the demand nodes in the order set by the topological ordering step and seeks to calculate a schedule fragment for each demand node. Each schedule fragment includes the origin and destination of the demand node, and specified conditions for the flight operation which will satisfy the demand node. These conditions include a particular aircraft, particular crew members, and a particular gate. The specified conditions are selected so that they are feasible, i.e., so that the aircraft exists and is not otherwise occupied; so that the slot or gate is available; and the crew members are qualified and available. The system also seeks to specify conditions for the schedule fragment so that a result function representing an expected outcome for flying the flight according to the conditions, meets a criterion. The most common result function is the contribution to margin expected from the operation, and the system seeks to maximize the expected contribution to margin from the operation.

Figure 10:
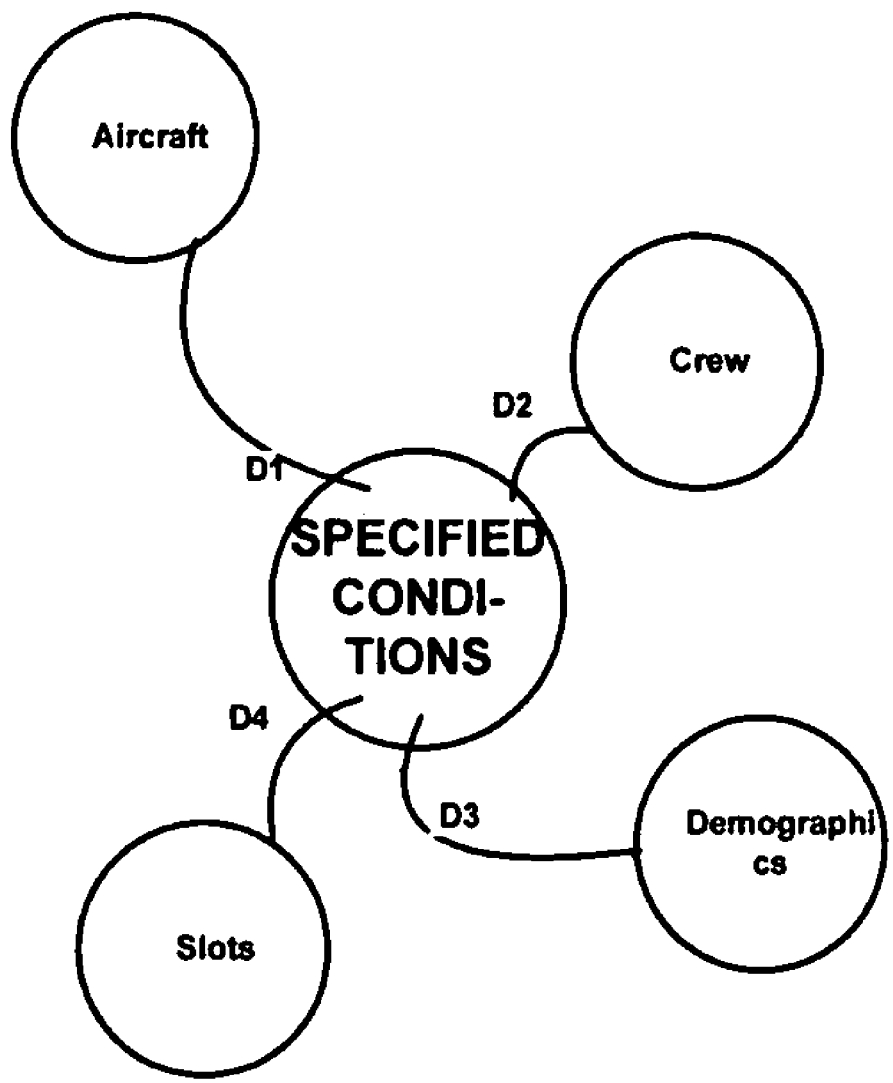
FIG. 10 is a diagrammatic view of a process used in the method of FIGS. 1-9.

The problem of selecting conditions to be specified in a schedule fragment can be understood with reference to FIG. 10. The distance $D_1$ between aircraft and the specified conditions represents a negative contribution to margin or cost associated flying the aircraft from the origin specified in the demand to the destination specified in the demand, and also includes a cost, if applicable, for repositioning the aircraft from another airport if necessary. The distance $D_2$ represents the cost of providing the crew, including both direct costs per hour and extraordinary costs such as relocation of crew members, overtime paid to crew members, and the like. The distance $D_3$ between the specified conditions and the demographics incorporated in the demand node represents negative effects on revenue resulting from specifying a departure time different from the departure time specified in the demand node, as for example, where the specified aircraft is not available at the departure gate at the time specified in the demand node. Distance $D_3$ also includes any loss of revenue resulting from specifying an aircraft which is too small to accommodate the expected passenger load. Distance $D_4$ represents a cost associated with the slot or gate used at the origin airport and destination airport. The system seeks to select conditions such that the sum of $D_1$-$D_4$ is at a minimum given the constraints imposed by the current state of the database of resources, i.e., availability of resources as indicated in the database. The minimization or maximization need not be a strict mathematical minimization or maximization. Stated another way, the system need not consider every possible alternative, but may in fact consider only some alternatives consistent with available resources so as to reach a local minimum or maximum. However, it is generally feasible to consider most or all available resources.

Figure 11:
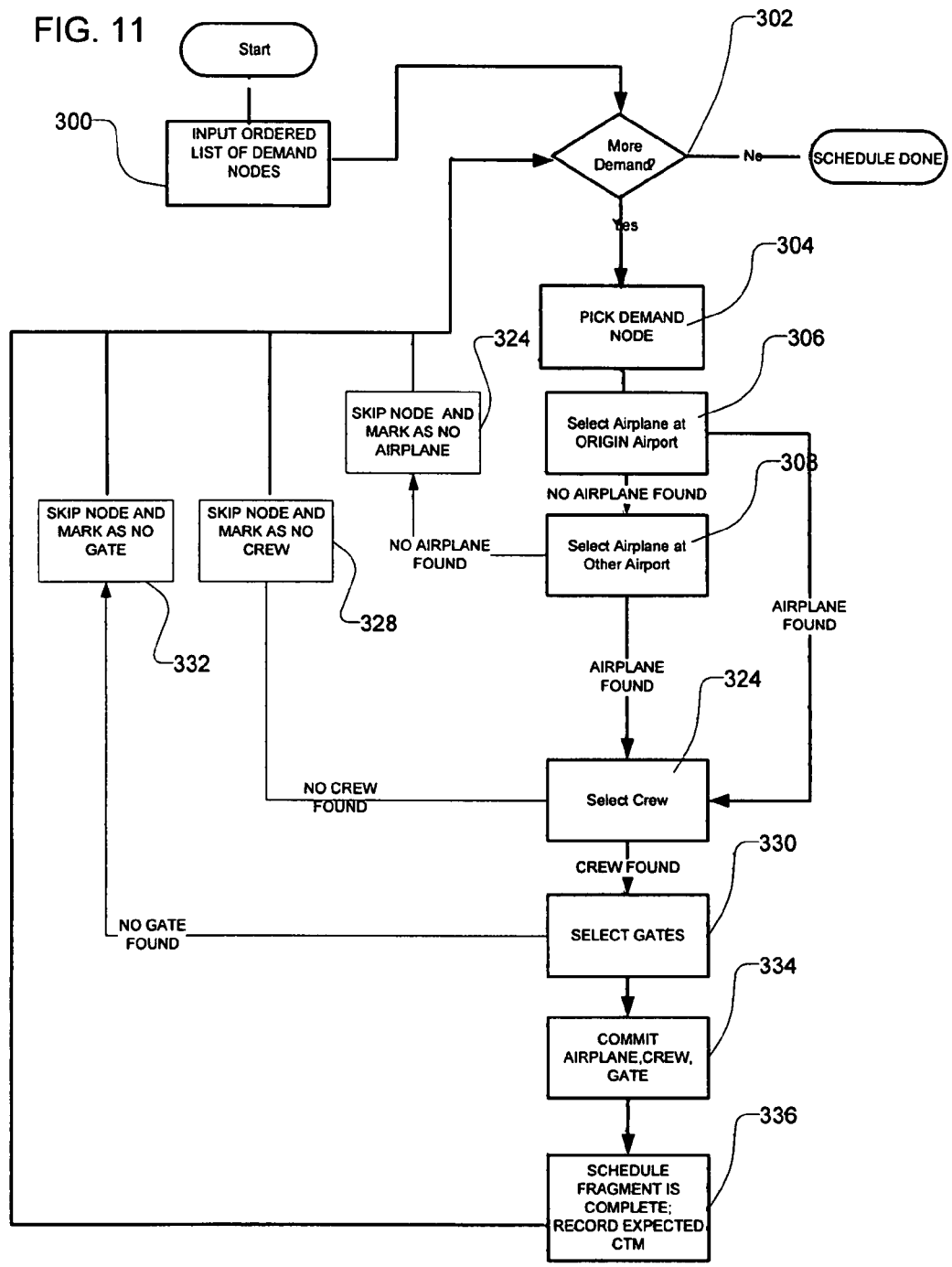
FIG. 11 is a further partial flow chart depicting certain steps used in the method of FIGS. 1-10.

One implementation of the process used to select conditions for schedule fragments is shown diagrammatically in FIG. 11. The process starts by inputting the ordered list of demand nodes resulting from the topological order step discussed above at step 300. At step 302, the system checks to see if all of the demand nodes have been treated. Assuming that there are untreated demand nodes, the system picks the first untreated demand node in the ordered list at step 304. In steps 306 and 308, the system attempts to select the best airplane from among the airplanes which are available to fly the flight specified by the origin, destination, and departure time of the demand. In these steps, the system seeks to find an airplane which, given the current state of the resource database, is indicated as available at the airport where the flight is to originate, or which can be flown to the origin airport and made available for the flight. From among these aircraft, the system seeks a particular aircraft which will have the least negative impact on CTM. Because it is almost always better to use an aircraft which is already parked at the origin airport, the system first examines airplanes which will be at the origin airport at the time of departure, in step 306. If a satisfactory airplane is found, the system skips step 308, and hence, does not examine the possibility of using airplanes which will be located elsewhere at the time of the operation.

Figure 12:
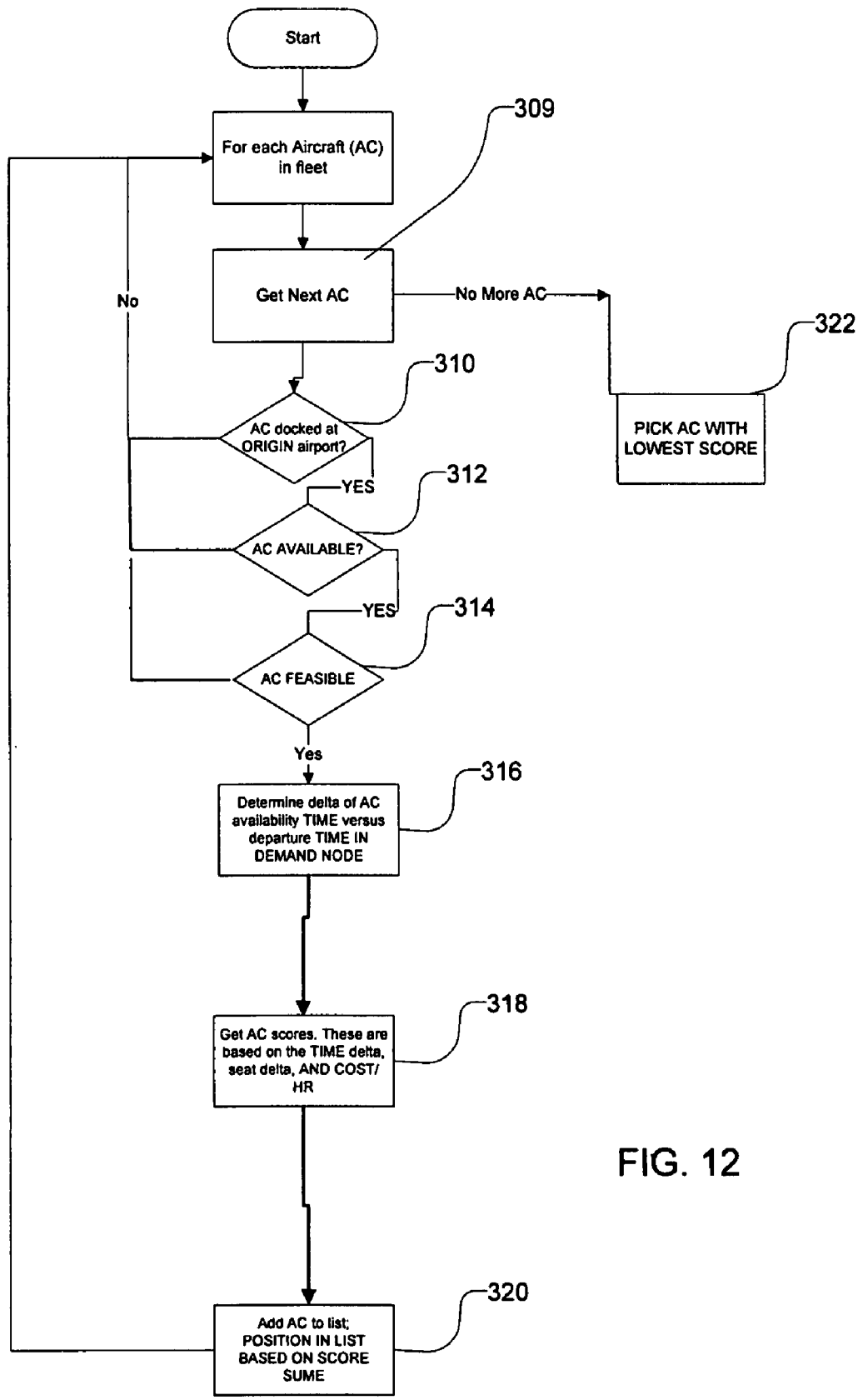
FIG. 12 is yet another partial flow chart depicting one of the steps shown in FIG. 11.

A selection process usable in step 306 is shown schematically in FIG. 12. At step 309, the process selects an aircraft from the fleet. If the resource database indicates that the aircraft will be docked at the origin airport indicated in the demand node, either at the departure time indicated in the demand node or within some predetermined window, such as an hour after the departure time, the system proceeds to the next step 312. Otherwise, the system discards the aircraft and returns to the aircraft selection step 309. At step 312, the system checks the resource database to determine whether the aircraft has been committed to another flight or to maintenance during the time required for the flight specified in the demand node. If the aircraft is not available, again, the system discards the aircraft and returns to step 309. If the aircraft is available, the system also checks whether the aircraft is a feasible aircraft for use in the flight specified in the demand node. For example, the system checks the range of the aircraft type against the length of the flight between the origin and destination airports. If the aircraft does not have sufficient range, it is not a feasible aircraft for the flight. Other factors can be considered in determining feasibility. For example, if the destination airport does not have sufficient runway length to accommodate an aircraft of a particular type, any aircraft of that type may be excluded. Assuming that an aircraft is not excluded, the system in step 316 determines the difference or "delta" between the time the aircraft will become available at the gate, according to the resource database, versus the departure time specified in the demand node. Of course, if the database indicates that the aircraft will be available at the requested departure time, delta would be 0.

In a further step 318, a system computes scoring factors for use of the selected aircraft in the demand node. One scoring factor is based on the availability time delta computed in step 316. This scoring factor may be based on an arbitrary value per minute set by the airline. Alternatively, this scoring factor may be computed based on a measure of variance in the demand nodes, such as the step function relating number of passengers to departure time discussed above with reference to FIG. 9. Thus, if the demand node includes a function relating number of passengers to departure time such as the step function of FIG. 9, the system may calculate the expected number of passengers based on that function so as to reflect the effect of changing the departure time to match the time when the aircraft will be available. The difference between the number of passengers in the demand node and the number of passengers resulting from evaluating the variance with time can be multiplied by the expected revenue per passenger to get a score or cost associated with delayed availability.

Additionally, the system computes a score or cost based on the cost per hour of flying the currently selected airplane. The system also computes a seat delta, i.e., the amount by which the number of passengers expected exceeds the number of seats in the aircraft. This cost is simply the product of the difference between number of seats and number of passengers multiplied by the expected revenue per passenger in the particular class. The system adds the various scores and computes a total score. This total score represents the negative effect on CTM of flying the particular aircraft, and thus represents $D_1$ of FIG. 10, and also represents the negative effect on CTM of any delay in the flight time caused by selection of the particular aircraft or any lack of capacity, and thus represents $D_3$ in FIG. 10. The system adds the aircraft to a list of feasible aircraft. The position of the aircraft in the list is based on the score. Therefore, the list is topologically ordered according to the scores of the various aircraft. The system returns to step 309 to process the next aircraft. If there are no more aircraft to be processed, the system branches to step 322 and picks the aircraft with the lowest score in the list and branches to the crew selection step 324, FIG. 11. If no aircraft are found in the list, this indicates that there are no feasible aircraft available at the origin airport specified in the demand node, and the system branches to step 308.

Step 308 is substantially identical to step 306, except that step 308 considers only aircraft which are not indicated as docked at the origin airport, and includes additional substeps to determine, based on information in the resource database, whether the aircraft can be flown to the origin airport in time to meet the departure time or within a specified window such as one hour after the departure time. Also, in step 308, the score for each aircraft includes a cost for the flight from the airport where the airplane is located at the relevant time to the origin airport. If no airplane is found in step 308, this indicates that the demand node cannot be met with the resources in the state indicated by the database. Thus, no schedule fragment is generated for the demand node. Instead, the demand node is simply marked in step 326 to indicate that this particular demand node was skipped as a result of having no feasible airplane.

When an airplane has been selected in step 306 or 308, the departure time of the flight operation servicing the demand node is adjusted to the time when the aircraft is available, if such time is different from the time specified in the demand node. Stated another way, the system adapts the schedule fragment to meet the available aircraft resources.

If an airplane is selected in step 306 or 308, the system passes to the crew selection step 324. The crew selection step is performed in a manner similar to the airplane selection steps 306 and 308. Thus, the system examines available crews, selects those which are feasible, and finds the lowest-cost feasible crew. The system desirably also considers balancing crew duty hours, so that crew members do not exceed maximum duty hours per month or per year. For example, an additional cost can be assigned to any crew member directly related to the number of duty hours previously scheduled for such crew member during the month being considered. The crew selection step uses the departure time and aircraft type found in the airplane selection steps. Thus, to be feasible, a crew must be qualified to fly aboard the type of airplane selected in step 306 or 308, and must be available at the origin airport at the departure time established in step 306 or 308. Also, the crew must have sufficient on-duty hours remaining at the departure time to allow the crew to complete the flight. The crew selection step may first address crews which, according to the resource database, will be disposed at the origin airport, and then address crews which can be relocated to the origin airport. Also, the crew selection step may process complete crews for the aircraft type, and then, if no complete crew can be found, the crew selection step may seek to find individual crew members to form a complete crew. Alternatively or additionally, the crew selection step may treat crew members having no duty history first, and then treat those crew members who have had duty history since their last previous day off duty. This can be helpful inasmuch as the computations required to determine whether a particular crew member has sufficient remaining duty hours given all of the constraints on duty hours may be time-consuming.

If no crew can be found, the system does not form a schedule fragment, but instead branches to step 328 and marks node as skipped because no crew was available. In a variant, if the failure to find crew was caused by the lack of a crew member having certain specific qualifications, as for example, the failure to find a pilot qualified on Boeing 747s, the system may mark the node with that specific indication.

Assuming that a crew is found, the system computes a score reflecting the cost of the crew, as for example, a score which reflects both the basic salary of the crew and any premium payments such as overtime, layover costs, and crew relocation flights which are associated with the crew. This score represents $D_2$ in FIG. 10. If a crew is found, the system branches to step 330 and searches for feasible gates at the origin and destination. Here again, if no gate is found, the system does not form a schedule fragment, but instead marks the node as skipped due to unavailability of a gate at a particular airport.

Assuming a gate is found, the system forms a schedule fragment and implements this schedule fragment by marking the resource database to commit the airplane, crew, and gates found in the preceding steps. Thus, the resources are indicated as occupied during the time required to complete the flight. Also, the system marks the database to indicate that the mobile resources, including the airplane and crew, will be positioned at the destination airport at the time corresponding to the end of the flight. The system also updates the status of the aircraft to indicate additional flight time since last maintenance, and updates the status of the crew members to indicate the additional duty time they will have devoted to the flight.

At this point, the individual schedule fragment is complete. The system may also record the expected contribution to margin of the flight if flown according to the schedule fragment at step 336.

In a variant, the system may test the proposed schedule fragment against one or more drop criteria before committing the sources at step 334. For example, if the proposed schedule fragment would result in a negative contribution to margin, the system may not commit the resources, but instead may mark the demand node as skipped due to negative CTM and return to step 302. In yet another variant, the system may override the drop criterion if one or more retention criteria are met. For example, the system may be arranged to retain the schedule fragment if the demand node is marked as a feeder for another demand. In a further variant, the retention criteria may include service to particular cities of particular importance to the airline. In yet another variant, the system may reexamine some previous allocations of resources. For example, if the results of the aircraft selection steps 306 and 308 indicate that no aircraft is available to meet the demand, or that the only aircraft available to meet the demand will yield poor results because they are much smaller than or much larger than the expected number of passengers, the system may examine aircraft previously assigned to flights which will arrive at the origin airport within a few hours after the departure time of the demand being treated and determine whether it is feasible to reschedule those flights so that the aircraft arrives earlier and, if so what the effect on CTM or other result would be. The system may also seek to reschedule a previously-scheduled flight if the first pass indicates that the selected aircraft will be available after the departure time in the demand being considered, and that such delay will reduce CTM from the demand being considered. In a further variant, the system can test the effect of splitting or combining demands at this stage. For example, if there is a first demand with a first departure time and 100 passengers expected, and the best available aircraft has 200 seats, the system may look for a demand with another departure time and determine whether it would be more profitable to combine the two demands. This stage can use a process similar to that discussed above with reference to FIGS. 7 and 8. However, in this case the examination of possible combining an splitting is performed based on those aircraft which would actually be available at the departure times of the combined or split demands in question, rather than on the best possible aircraft.

After a schedule fragment has been completed for a demand node or the demand node has been skipped, the system checks if there are more demand nodes to be treated at step 302. If so, the system picks the next demand node at step 304 and repeats the steps discussed above. If there are no further demand nodes, the schedule is complete. The system may output a total expected CTM resulting from adding all of the CTMs associated with the individual schedule fragments.

As indicated above with reference to FIG. 1, the system may adjust the resources and repeat either the entire scheduling process or a portion of the scheduling process. The adjustment to resources can be based on the information about the causes of skipped demands acquired when demands are marked at steps 324, 328, and 332. For example, if the markings indicate that numerous demands are being skipped to a shortage of flight attendants qualified on Embraer airplanes, and that these skips occur primarily on March 31 and later, the system may adjust the database of resources to indicate that there are additional flight attendants so qualified and issue an indication that such additional flight attendants should be hired and trained to be available as of March 31. The system may recalculate the entire schedule based on the assumption that a certain number of additional flight attendants are available for March 31 onward. Alternatively, if the demands have been ordered according to departure time and date, the system may recalculate only that portion of the schedule from March 31 onward, and concatenate the recalculated schedule with the earlier-calculated schedule prior to March 31 to form a composite schedule. Total CTM for the recalculated schedule can be compared to the CTM for the original schedule to determine whether the suggested change in resources is economically desirable. Likewise, if the skipped node indications suggest that additional airplanes of a particular type should be made available, the system may alter the database of resources to indicate that such additional airplanes are available, recalculate the schedule or a portion of the schedule with such indication, and compare the CTM of the recalculated schedule with the CTM of the original schedule to determine the advantage obtainable by acquiring or leasing more airplanes.

Figure 13:
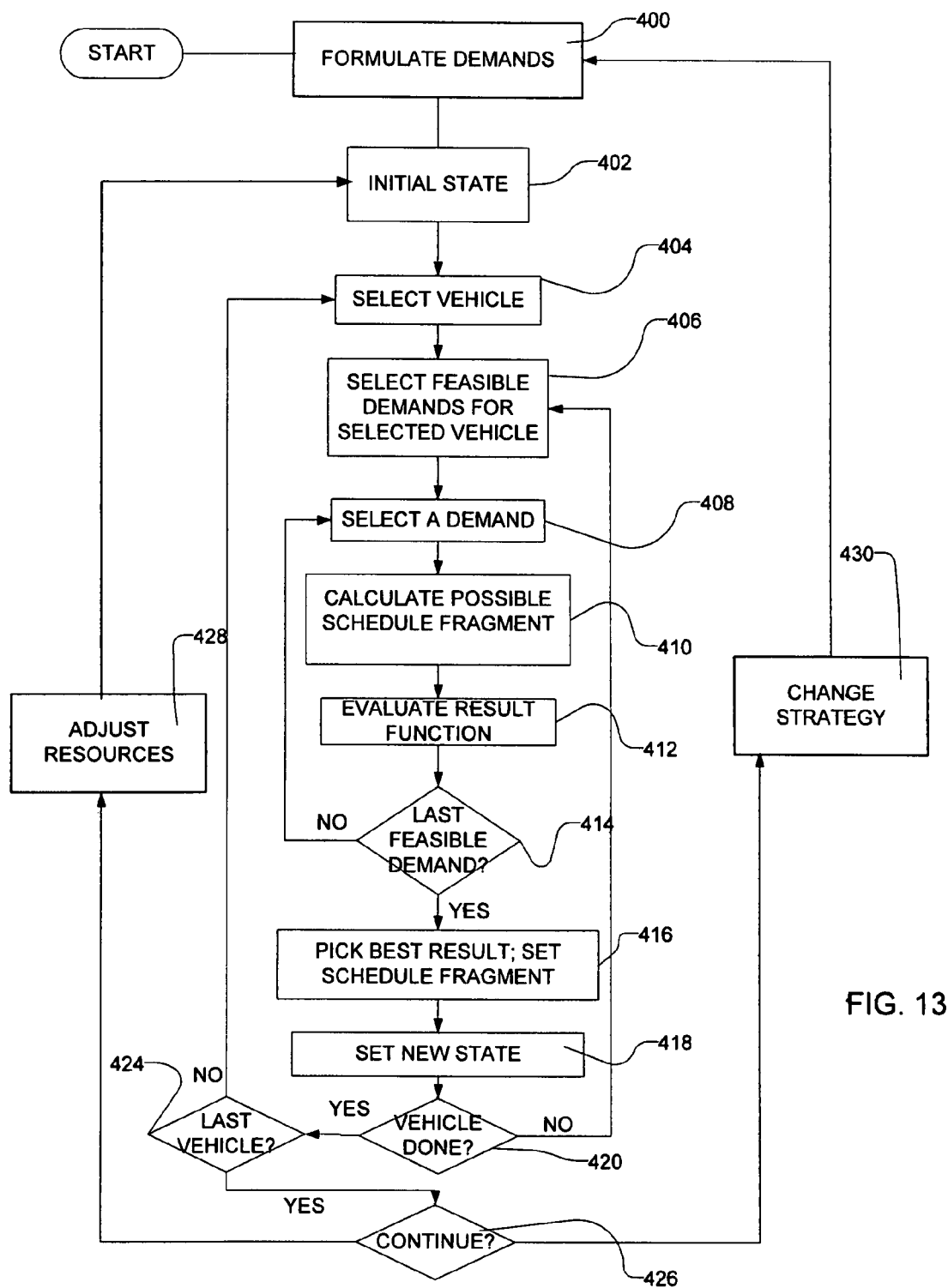
FIG. 13 is a diagrammatic flow chart depicting a process in accordance with a further embodiment of the invention.

A process according to another embodiment of the invention, schematically illustrated in FIG. 13, utilizes demands similar to those discussed above. The demands may be formulated in step 400 by essentially the same processes as discussed above with reference to FIGS. 2-9. Here again, each demand may include an origin, a destination, and a desired departure time or arrival time, and desirably also includes information specifying an estimated load such as a passenger load in each fare class in the case of a passenger airline. Here again, each demand may include information relating load (such as passenger load or passenger load in each fare class) to departure time or arrival time. Here again, the system maintains a database of resources which includes at least a list of vehicles, and desirably includes a list of vehicles having information as discussed above such as the status of each vehicle, as for example, disposed at a particular terminal such as an airport or en route, for each time during the future interval which is to be encompassed by the schedule. The database desirably also includes other resources, as for example, terminal gates and crews, and desirably includes the same information as discussed above. Here again, at the start of the scheduling procedure, the database is in an initial state.

The system selects a particular vehicle from the database at step 404. This selection may be based upon an ordering of vehicles by type or even by vehicle identity. For example, an airline may choose to schedule its most expensive airplanes first, so as to make the best use of these particular airplanes, in which case the most expensive airplanes would be first in the order of vehicles, and hence, one of these most expensive airplanes would be selected first.

Having selected a particular vehicle, the system at step 406 evaluates the state of the vehicle, finds the next time when the vehicle will be available, and selects a set of feasible demands which could conceivably be met by use of the selected vehicle. For example, if the selected vehicle is listed in the database as being occupied in maintenance or in previously scheduled operations through a particular date and time, the system may select a set of feasible demands by excluding those demands having departure times long before the particular date and time when the vehicle will become available. Also, the system at this stage may exclude demands which are infeasible for the particular vehicle, as for example, those demands calling for a destination airport having runway lights smaller than that required by an aircraft in question, or having a flight distance longer than the range of an aircraft in question. The system may also exclude demands which may be technically feasible but highly unlikely to yield a profitable result if served with this particular vehicle, as for example, demands with origins located more than a certain distance from the location of the vehicle as indicated by the database. It is possible to omit this step and use as the set of demands all of the demands in the database; infeasible demands can be excluded during later stages. However, selecting a set of feasible demands reduces the number of calculations.

At step 408, the system selects one of the demands in the set from step 406, and then, at step 410, calculates a schedule fragment for the demand based on the assumption that the particular vehicle selected at step 404 will be used to fulfill that demand. The step of calculating a schedule fragment can be performed using steps similar to those discussed above so as to select the best resources, such as crew and gates, to complete the schedule fragment and to adjust the departure time, if necessary, to a departure time at or after the availability time of the aircraft. Here again, the system calculates a result function at step 412 for the possible schedule fragment resulting from step 410. As discussed above, the result function may include a financial result such as CTM for the possible schedule fragment. The result function optionally may include a penalty for idle time spent by the aircraft from its availability time to the departure time. At step 414, the system determines whether all of the demands in the set of demands from step 406 have been processed. If not, the system returns to step 408, selects another demand from the set, and repeats steps 410 and 412 for that demand, so as to provide a possible schedule fragment and the associated result function for the next demand. This process continues until all of the feasible demands have been processed to yield possible schedule fragments and associated result functions. The system then branches to step 416, where it selects the particular demand which has yielded the best result function, as for example, the highest CTM of all the demands in the set from step 406. In this regard, if step 406 was omitted or used very broad criteria so that the set included infeasible demands, the system would determine feasibility during the step of calculating a possible schedule fragment (step 410), and would exclude any demand which resulted in infeasibility from the selection at step 416.

Once the best result has been selected, a schedule fragment is set by taking the conditions specified in the possible schedule fragment associated with the best result and committing resources, including the selected vehicle and other resources, to that schedule fragment. Thus, the database is updated at step 418 to a new state, indicating that the selected vehicle and any other resources used in the set schedule fragment are committed. Once the new state has been set, the system returns again to step 406 and selects a new set of feasible demands for the selected aircraft based upon the new state. For example, if the last previous pass through steps 406-416 resulted in setting a schedule fragment which takes the vehicle to San Francisco as its destination, and which makes the vehicle available for further use at 3:00 p.m. on a particular date, the next pass through steps 406-416 will result in selection of the demand which best utilizes the aircraft based on its position in San Francisco and its availability time of 3:00 p.m. on that date. This process continues until, at step 420, the system determines that the vehicle is completely scheduled through the interval of time to be covered by the schedule being generated. If the vehicle has been completely scheduled, the system checks at step 424 to determine if this is the last vehicle to be scheduled. If not, the system branches back to step 404, selects the next vehicle and repeats steps 406-420 with that vehicle, so as to develop a full schedule for the next vehicle in the same manner; and the process repeats until all vehicles have been scheduled, whereupon the schedule is complete.

Scheduling in this manner uses the same general approach as discussed above with reference to FIG. 10, i.e., picking conditions which minimize the cost or maximize some other result for a particular flight operation. In this embodiment, however, the demands are addressed in the order in which they become feasible for a particular aircraft. Stated another way, this embodiment follows an aircraft through the schedule and finds the best use for that aircraft at any time during the schedule, repeating the process until the aircraft has been fully scheduled for the required time intervals. In a variant of this process, the system may not compute the entire schedule for each vehicle before selecting the next vehicle. For example, after setting a new state recording a schedule fragment for a particular vehicle, the system may branch back to step 404 and select another vehicle. The step of selecting a vehicle may be configured in this embodiment to select a vehicle from among all of the vehicles of a particular type based on the number of times that vehicle has been selected, so that the vehicle which has previously been selected the fewest number of times will be picked. In this manner, the system essentially finds the best use for each vehicle in a first operation starting from the initial state. Then, when the state of the system indicates that each vehicle has been scheduled for a first operation, the system seeks the best use of each vehicle once again for a second operation. This process continues until all of the vehicles have been scheduled throughout the entire time interval time to be covered by the schedule.

In each of these embodiments, after a complete schedule has been formulated, either a human operator or the system may decide to adjust resources as indicated schematically at step 428, or to change the strategy by which demands are formulated as indicated schematically at step 430 and repeat the process to generate another schedule. Here again, schedules developed with various sets of resources, and different strategies can be generated rapidly and can be compared with one another.

In yet another variant, the system may use the vehicle-ordered scheduling approach discussed above with reference to FIG. 13 to set a portion of the schedule, and may use the demand-ordered approach discussed with reference to FIG. 11 to set the other portion of the schedule. In the embodiments discussed above, the scheduling process includes resources other than vehicles, i.e., crew and airport gates. In a more limited variant, the scheduling processes discussed herein can be used to schedule only vehicles, and external processes can be used to schedule other resources. In this more limited variant, the database may include only information pertaining to vehicles.

The systems discussed above desirably provide times for maintenance of vehicles. For example, aircraft typically must be serviced at the end of each flight. Maintenance of this type typically requires a fixed interval and can be performed at any location. Therefore, the system desirably simply adds an interval for maintenance at the end of each flight. Other maintenance, commonly referred to as "C" and "D" maintenance, must be performed at specified maintenance centers, which may or may not be at terminals served by the airline. Maintenance of this type must be performed at intervals set by rules which may include, for example, specified numbers of flying hours, takeoffs or landings, or calendar days, or some combination of these. As set forth above, the resource database maintained by the system contains status information for each aircraft, which includes these factors. The system may review the database or a portion of the database pertaining to a particular aircraft each time the aircraft is incorporated into a schedule fragment. If the status of the aircraft at the end of the new schedule fragment will be such that the aircraft requires maintenance, the system may simply schedule the aircraft a priori for the particular maintenance required, mark the resource database to indicate that the aircraft will be out of service for the required interval (typically days or weeks), and pass a signal to a maintenance control system or to a human operator indicating when the aircraft will be made available for maintenance and the type of maintenance required. In a further variant, if the status information for a particular aircraft indicates that a maintenance deadline is approaching, the system may set an artificially low cost for the aircraft to fly to a destination at or near the appropriate maintenance base, thus increasing the probability that the next scheduled demand will take the aircraft to or near the maintenance base. The ability to interact with maintenance systems and to schedule aircraft realistically with full cognizance of required maintenance provides a significant advantage.

Each of the systems discussed above begins the scheduling process based upon an initial state of the aircraft and other resources, and builds the database of future states which the aircraft are expected to be in at future times by generating the schedule fragments. Most typically, the initial state is a predicted state at some time after the scheduling operation is performed. For example, an airline may use the system during January to generate a schedule for operations during July and August, such schedule being based upon an assumed initial state of aircraft as of July 1. However, because the scheduling process is extremely rapid, it can be used as a real-time scheduling tool, with the initial state being an observed state on the date of scheduling. Thus, the scheduling process can allow the airline to react to actual events such as weather disruptions by picking the most efficient schedule to fly from that date forward.

In the discussion above, the result function has been stated in terms of a financial result, such as CTM. However, non-financial results also can be evaluated. For example, the result function for a particular demand may include waiting time for passengers transferring from feeder flights. Waiting time can be evaluated independently or can be translated into a financial cost reflecting the airline's expectation that a passenger inconvenienced by a lengthy layover time will become a less loyal customer. Such a cost may be subtracted from CTM to yield a final result function.

Figure 14:
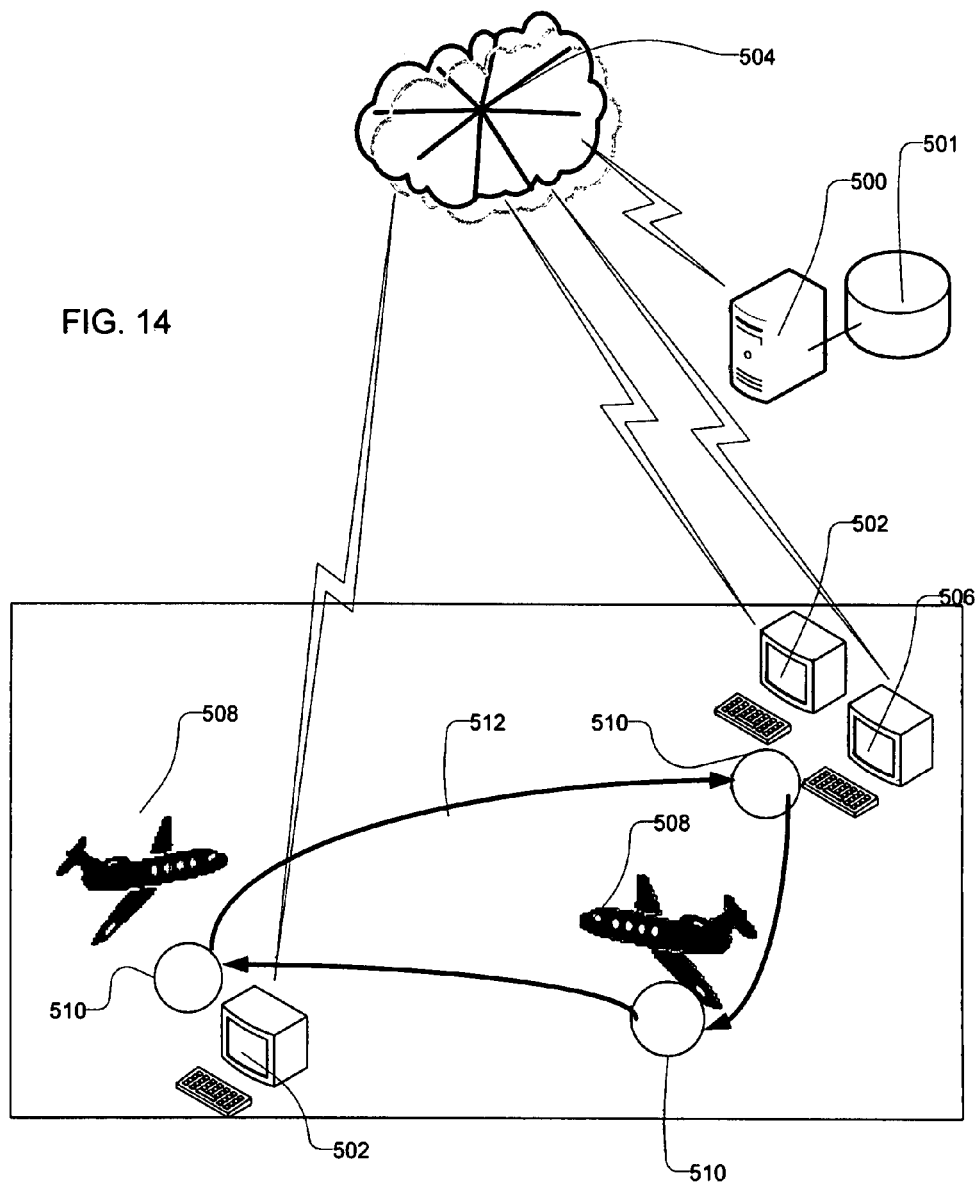
FIG. 14 is a schematic representation of a computer system and transportation system used in an embodiment of the invention.

The computations discussed above can be performed using a conventional general-purpose computer 500 (FIG. 14) which includes the normal elements of a computer, such as a processor, and a memory for holding the resource database and schedule fragments. The computer also includes a programming element which includes a computer-readable medium 501 and a program stored on such medium, the program being operative to cause the computer to perform the steps discussed above. The medium 501 may be separate from the memory used to store the resource database and schedule fragments, or may be integrated therewith. For example, the medium 501 may be a disk, tape or solid-state memory incorporated in the computer. As shown symbolically in FIG. 14, one system for performing these calculations includes a computer 500 programmed to perform the operations discussed above; and also includes one or more input nodes 502 for supplying input information which at least partially defines services to be provided in the transportation operation to be scheduled. In the embodiment depicted, the input nodes 502 are shown as input terminals, and these nodes can be used to supply any of the elements of information to be processed in the methods as discussed above. The system further includes at least one output node 506 arranged to receive information representing at least some of the resources assigned to schedule fragments from the computer 500. Desirably, each output node 506 is arranged to display or output this information in human-readable form, as for example, on a screen display or printout. Although input nodes 502 and output nodes 506 are shown separately, these nodes may be combined with one another. The input and output nodes may be connected to computer 500 directly if the nodes are in the same location as the computer. Nodes 502 and 506 may be disposed at locations distant from computer 500, and may be connected to the computer by any suitable means of communication, as for example, by a local connection through a network such as the internet 504, schematically depicted in FIG. 14. Although computer 500 is shown as a single element in FIG. 14, the elements of computer 500 may be distributed at various locations connected to one another by any suitable means of communication. Also, although the input and output nodes desirably are linked to computer 500 by a network or other form of instantaneous communication, this is not essential; the input and output nodes may be arranged to provide the input information and receive the output information in hard copy or on suitable electronic media that can be physically transported between the nodes and the computer.

The computer input nodes and output nodes form part of a larger transportation system which includes vehicles such as aircraft 508, and terminals 510 such as airports. As discussed above, the schedule defines routes between terminals 510, which correspond to physical routes 512. The input and output nodes may be located at one or more of terminals 510, or at another location.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A computer-implemented method of generating a schedule for a transportation operation, comprising:
    a) providing one or more lists of available resources and an ordered list of a plurality of demands for transportation between a plurality of origins and a plurality of destinations in a memory of a computer, each demand being associated with an origin, a destination and a departure time;
    b) using a processor of the computer to set a schedule fragment to satisfy one of the demands in the ordered list, the step of setting the schedule fragment including assigning a resource from the one or more lists of available resources by:
        (i) selecting a resource from the one or more lists of available resources and determining whether the selected resource will be available at the departure time associated with the demand;
        (ii) evaluating a result function associated with assignment of the selected resource to satisfy the demand, such evaluation including, based on a determination that the selected resource is not available at the departure time associated with the demand, modifying the departure time associated with the demand so that the selected resource is available at the modified departure time, and evaluating an effect of the modified departure time on the result function, the step of evaluating an effect of the modified departure time including evaluating load for the demand as a function of departure time;
        (iii) repeating steps (i)-(ii) for a plurality of resources; and
        (iv) assigning to the demand that resource which yields a minimum value or a maximum value of the result function of the resources selected in steps (i)-(iii), and
    c) using the processor of the computer to modify the one or more lists of available resources in the memory to indicate a revised state based on the assignment of resources in step (b); and
    d) using the processor of the computer to repeat steps (b) and (c) so that steps (b) and (c) are performed for the plurality of demands according to the order of the demands in the list and so that step (b) for each demand is performed using the state resulting from step (c) for the immediately previous demand.

2. A method as claimed in claim 1 wherein the resources include vehicles.

3. A method as claimed in claim 1 wherein the step of modifying the departure time is performed within a range of times selected based at least in part upon previously-determined schedule fragments for other demands.

4. A method as claimed in claim 1 wherein the step of setting a schedule fragment is performed so that the result function for the schedule fragment meets one or more criteria.

5. A method as claimed in claim 4 wherein the one or more criteria includes maximization or minimization of the result function for the schedule fragment.

6. A method as claimed in claim 1 wherein the result function includes one or more financial values for the schedule fragment.

7. A method as claimed in claim 6 further comprising aggregating the financial values for the schedule fragments to derive an aggregate financial value for the schedule.

8. A method as claimed in claim 7 wherein each demand includes a predicted load, the method further including the step of deriving the predicted loads for the demands based at least in part on one or more estimates of market behavior.

9. A method as claimed in claim 8 further comprising the steps of adjusting the one or more estimates of market behavior, and repeating the aforesaid steps using the adjusted estimates of market behavior.

10. A method as claimed in claim 9 wherein the step of adjusting the one or more estimates of market behavior includes adjusting at least one aspect of a price to be charged for transportation and value to be offered in such transportation and applying an estimated relationship between the at least one aspect of the price and value and demand for transportation.

11. A method as claimed in claim 10 wherein the at least one aspect of price and value includes the amount to be paid by a customer for transportation.

12. A method as claimed in claim 10 wherein the at least one aspect of price and value includes a level of an ancillary service supplied to a customer in exchange for purchase of transportation.

13. A method as claimed in claim 7 further comprising the steps of modifying resources, repeating the aforesaid steps for at least some of the demands using the modified resources.

14. A method as claimed in claim 13 further comprising the step of comparing the aggregate financial values achieved with different sets of resources.

15. A method as claimed in claim 1 wherein the step of setting a schedule fragment for a demand includes scheduling no service for the demand if the result function for the demand with the assigned resource meets one or more drop criteria.

16. A method as claimed in claim 15 wherein the one or more drop criteria include the absence of one or more retention criteria.

17. A method as claimed in claim 1 wherein the step of providing an ordered list includes establishing a plurality of sort keys and ordering the demands according to the plurality of sort keys.

18. A method as claimed in claim 17 wherein the sort keys include a continuity value indicative of whether a particular demand is one of a series of demands to be served successfully by a single vehicle.

19. A method as claimed in claim 17 wherein the sort keys include at least one financial value for the demand.

20. A method as claimed in claim 17 wherein the sort keys include at least one of departure time and arrival time.

21. A method as claimed in claim 17 wherein the step of providing an ordered list further includes a step of modifying the list ordered according to the plurality of sort keys based upon one or more continuity relationships between demands.

22. A method as claimed in claim 17 further comprising a step of modifying at least one of the demands or the sort keys and repeating the aforesaid steps.

23. A method as claimed in claim 1 wherein the list of resources includes a database of resources available at particular locations and times and wherein the step of setting a schedule fragment for a particular demand includes deducting resources from the resources available at the origin.

24. A method as claimed in claim 23 further wherein the step of setting a schedule fragment for a particular demand further includes the step of adding mobile resources to the database of resources available at the destination associated with the demand for a time following an expected completion time of the operation associated with the demand.

25. A method as claimed in claim 23 further comprising the step of:
(x) determining that the resources available at the origin associated with the demand for a desired departure time associated with the demand are insufficient to allow the operation associated with the demand and,
(y) in response to the determination in (x), determining from the database whether mobile resources exist at another location and can be relocated to origin in time for an operation with the desired departure time.

26. A method as claimed in claim 25 further comprising the step, if mobile resources cannot be relocated to the origin in time for an operation with the desired departure time, determining the earliest feasible departure time after the desired departure time when all resources can be made available and setting a departure time at the earliest feasible departure time.

27. A method as claimed in claim 26 further comprising returning an error message indicating that unavailability of a particular resource precludes setting a schedule fragment for a particular demand if no earliest feasible departure time within a range of acceptable departure times can be found.

28. A method as claimed in claim 27 further comprising accumulating information from a plurality of the error messages indicative of which resources constrain operation of the transportation system.

29. A method as claimed in claim 28 further comprising adjusting the resources responsive to the accumulated information and repeating the aforesaid steps using the adjusted resources for at least some of the demands.

30. A method as claimed in claim 24 wherein the mobile resources include vehicles.

31. A method as claimed in claim 27 wherein the mobile resources include crews.

32. A method as claimed in claim 1 further comprising compiling the schedule fragments to form a schedule and operating the transportation system according to the schedule.

33. A method as claimed in claim 32 wherein the transportation system is an airline.

34. A computer-implemented method of generating a schedule for a transportation operation, comprising:
a) providing in a memory of a computer a list of a plurality of demands for transportation between a plurality of origins and a plurality of destinations, each demand being associated with an origin, a destination and a departure time, and a list of resources including a plurality of vehicles and information specifying location of each vehicle versus time;
b) using a processor of the computer to select a vehicle from the vehicles identified in the list of resources;
c) using the processor of the computer to set a schedule fragment, the step of setting a schedule fragment including assigning the selected vehicle to a demand by:
(i) selecting a demand from the list of demands and determining whether the selected vehicle will be available at the departure time associated with the demand;
(ii) evaluating a result function associated with assignment of the selected vehicle to satisfy the demand, such evaluation including, based on a determination that the selected vehicle is not available at the departure time associated with the selected demand, modifying the departure time associated with the demand so that the selected resource is available at the modified departure time, and evaluating an effect of the modified departure time on the result function, the step of evaluating an effect of the modified departure time including evaluating load for the demand as a function of departure time;
(iii) repeating steps (i)-(ii) for a plurality of demands; and
(iv) assigning the selected vehicle to the demand which yields a minimum value or a maximum value of the result function of the demands selected in steps (i)-(iii), and
d) using a processor of the computer to modify the list of resources and list of demands in the memory to indicate a revised state based on the use of vehicles and demands in step (c); and
e) using a processor of the computer to repeat steps (b) through (d) so that steps (b) through (d) are performed for the plurality of demands and so that step (c) for each repetition is performed using the state resulting from step (d) for the immediately previous repetition.

35. A method as claimed in claim 34 wherein the result function includes one or more financial values.

36. A method as claimed in claim 35 further comprising aggregating the financial values for the schedule fragments to derive an aggregate financial value for the schedule.

37. A method as claimed in claim 35 wherein each demand includes a predicted load, the method further including the step of deriving the predicted loads for the demands based at least in part on one or more estimates of market behavior.

38. A method as claimed in claim 37 further comprising the steps of adjusting the one or more estimates of market behavior, and repeating the aforesaid steps using the adjusted estimates of market behavior.

39. A method as claimed in claim 38 wherein the step of adjusting the one or more estimates of market behavior includes adjusting at least one aspect of a price to be charged for transportation and value to be offered in such transportation and applying an estimated relationship between the at least one aspect of the price and value and demand for transportation.

40. A scheduling system for a transportation operation, comprising:
a) at least one input node operable to receive input information at least partially defining services to be provided in the transportation operation;
b) a computer connected to the at least one input node so that input information received by the input node will be supplied to the computer, the computer being operable in response to the input information to:
(1) maintain one or more lists of available resources and an ordered list of a plurality of demands for transportation between a plurality of origins and a plurality of destinations, each demand specifying a particular origin, a particular destination and a time for departure from the particular origin;

(2) set a schedule fragment to satisfy one of the demands in the ordered list, the step of setting the schedule fragment including assigning a resource from the one or more lists of available resources, by:
  (i) selecting a resource from the one or more lists of available resources and determining whether the selected resource will be available at the departure time associated with the demand;
  (ii) evaluating a result function associated with assignment of the selected resource to satisfy the demand, such evaluation including, based on a determination that the selected resource is not available at the departure time associated with the demand, modifying the departure time associated with the demand so that the selected resource is available at the modified departure time, and evaluating an effect of the modified departure time on the result function, the step of evaluating an effect of the modified departure time including evaluating load for the demand as a function of departure time; and
  (iii) repeating steps (i)-(ii) for a plurality of resources; and
  (iv) assigning to the demand that resource which yields the best value of the result function of the resources selected in steps (i)-(iii);
(3) modify the one or more lists of available resources to indicate a revised state based on the use of resources in step (2); and
(4) repeating steps (2) and (3) so that steps (2) and (3) are performed for the plurality of demands according to the order of the demands in the list and so that step (2) for each demand is performed using the state resulting from step (3) for the immediately previous demand; and c) at least one output node connected to the computer so that output information representing at least some of the resources assigned to schedule fragments will be supplied to the at least one output node.

41. A system as claimed in claim 40 wherein the computer is connected with at least one output node and the at least one input node through an electronic communications network.

42. A scheduling system for a transportation operation, comprising:
a) at least one input node operable to receive input information at least partially defining services to be provided in the transportation operation;
b) a computer connected to the at least one input node so that input information received by the input node will be supplied to the computer, the computer being operable in response to the input information to:
  (1) maintain a list of a plurality of demands for transportation between a plurality of origins and a plurality of destinations, each demand being associated with an origin, a destination and a departure time and one or more lists of resources including a plurality of vehicles and information specifying location of each vehicle versus time;
  (2) select a vehicle from the one or more vehicles identified in the list of vehicles;
  (3) set a schedule fragment by assigning the selected vehicle to one of the demands from the list, the step of assigning the selected vehicle including:
    (i) selecting a demand from the list of demands and determining whether the selected vehicle will be available at the departure time associated with the demand;
    (ii) evaluating a result function associated with assignment of the selected vehicle to satisfy the demand, such evaluation including, based on a determination that the selected vehicle is not available at the departure time associated with the selected demand, modifying the departure time associated with the demand so that the selected resource is available at the modified departure time, and evaluating an effect of the modified departure time on the result function, the step of evaluating an effect of the modified departure time including evaluating load for the demand as a function of departure time;
    (iii) repeating steps (i)(ii) for a plurality of demands; and
    (iv) assigning the selected vehicle to the demand which yields the best value of the result function of the demands selected in steps (i)-(iii);
  (4) modify the one or more lists of vehicles and list of demands to indicate a revised state based on the use of vehicles and demands in step (3); and
  (5) repeat steps (2) through (4) so that steps (2) through (4) are performed for the plurality of demands and so that step (3) for each repetition is performed using the state resulting from step (4) for the immediately previous repetition.

43. A system as claimed in claim 42 wherein the computer is connected with at least one output node and the at least one input node through an electronic communications network.

44. A transportation system comprising:
a) a plurality of vehicles;
b) a plurality of terminal locations;
c) at least one input node operable to receive input information at least partially defining services to be provided in the transportation operation;
d) a computer connected to the at least one input node so that input information received by the input node will be supplied to the computer, the computer being operable in response to the input information to perform either:
A. a method including steps 1) through 4) of:
  1) providing one or more lists of available vehicles and an ordered list of a plurality of demands for transportation between a plurality of origins and a plurality of destinations in a memory of the computer, each demand being associated with an origin, a destination and a departure time;
  using a processor of the computer to:
  2) set a schedule fragment to satisfy one of the demands in the ordered list, the step of setting the schedule fragment including assigning a vehicle from the one or more lists of available resources by:
    (i) selecting a vehicle from the one or more lists of available vehicles and determining whether the selected vehicle will be available at the departure time associated with the demand;
    (ii) evaluating a result function associated with assignment of the selected vehicle to satisfy the demand, such evaluation including, based on a determination that the selected vehicle is not available at the departure time associated with the demand, modifying the departure time associated with the demand so that the selected vehicle is available at the modified departure time, and evaluating an effect of the modified departure time on the result function, the step of evaluating an effect of the modified departure time including evaluating load for the demand as a function of departure time; and (iii) repeating steps (i)-(ii) for a plurality of vehicles; and (iv) assigning to the demand that vehicle which yields the best value of the result function of the vehicles selected in steps (i)-(iii), and 3) modifying the one or more lists of available vehicles in the memory to indicate a revised state based on the assignment of vehicles in step (2); and 4) repeating steps (2) and (3) so that steps (2) and (3) are performed for the plurality of demands according to the order of the demands in the list and so that step (2) for each demand is performed using the state resulting from step (3) for the immediately previous demand; or B. a method including steps 5) through 9) of:

5) providing in a memory of the computer a list of a plurality of demands for transportation between a plurality of origins and a plurality of destinations, each demand being associated with an origin, a destination and a departure time, and a list of vehicles and information specifying location of each vehicle versus time;

using a processor of the computer to:

6) select a vehicle from the vehicles identified in the list of vehicles;

7) set a schedule fragment, the step of setting a schedule fragment including assigning the selected vehicle to a demand by:

(v) selecting a demand from the list of demands and determining whether the selected vehicle will be available at the departure time associated with the demand;

(vi) evaluating a result function associated with assignment of the selected vehicle to satisfy the demand, such evaluation including, based on a determination that the selected vehicle is not available at the departure time associated with the selected demand, modifying the departure time associated with the demand so that the selected vehicle is available at the modified departure time, and evaluating an effect of the modified departure time on the result function, the step of evaluating an effect of the modified departure time including evaluating load for the demand as a function of departure time;

(vii) repeating steps (v)-(vi) for a plurality of demands; and (viii) assigning the selected vehicle to the demand which yields the best value of the result function of the demands selected in steps (v)-(vii), and 8) modifying the list of vehicles and list of demands to indicate a revised state based on the use of vehicles and demands in step (7); and 9) repeating steps (6) through (8) so that steps (6) through (8) are performed for the plurality of demands and so that step (7) for each repetition is performed using the state resulting from step (8) for the immediately previous repetition; and e) at least one output node disposed at one or more of the terminal locations and connected to the computer so that output information representing vehicles assigned to schedule fragments by the process will be supplied to the at least one output node.

45. A transportation system as claimed in claim 44 wherein the vehicles include airplanes and the terminal locations include airports.

46. A computer-readable storage medium having a program stored thereon, the program being operative to cause a computer to perform either:

A. a method including steps 1) through 4) of:

1) providing one or more lists of available vehicles and an ordered list of a plurality of demands for transportation between a plurality of origins and a plurality of destinations in a memory of the computer, each demand being associated with an origin, a destination and a departure time;

using a processor of the computer to:

2) set a schedule fragment to satisfy one of the demands in the ordered list, the step of setting the schedule fragment including assigning a vehicle from the one or more lists of available vehicles by:

(i) selecting a vehicle from the one or more lists of available vehicles and determining whether the selected vehicle will be available at the departure time associated with the demand;

(ii) evaluating a result function associated with assignment of the selected vehicle to satisfy the demand, such evaluation including, based on a determination that the selected vehicle is not available at the departure time associated with the demand, modifying the departure time associated with the demand so that the selected vehicle is available at the modified departure time, and evaluating an effect of the modified departure time on the result function, the step of evaluating an effect of the modified departure time including evaluating load for the demand as a function of departure time; and (iii) repeating steps (i)-(ii) for a plurality of vehicles; and (iv) assigning to the demand that vehicle which yields the best value of the result function of the vehicles selected in steps (i)-(iii), and 3) modifying the one or more lists of available vehicles in the memory to indicate a revised state based on the assignment of vehicles in step (2); and 4) repeating steps (2) and (3) so that steps (2) and (3) are performed for the plurality of demands according to the order of the demands in the list and so that step (2) for each demand is performed using the state resulting from step (3) for the immediately previous demand; or B. a method including steps 5) through 9) of:

5) providing in a memory of the computer a list of a plurality of demands for transportation between a plurality of origins and a plurality of destinations, each demand being associated with an origin, a destination and a departure time, and a list of vehicles and information specifying location of each vehicle versus time;

using a processor of the computer to:

6) select a vehicle from the vehicles identified in the list of vehicles;

7) set a schedule fragment, the step of setting a schedule fragment including assigning the selected vehicle to a demand by:

(v) selecting a demand from the list of demands and determining whether the selected vehicle will be available at the departure time associated with the demand;

(vi) evaluating a result function associated with assignment of the selected vehicle to satisfy the demand, such evaluation including, based on a determination that the selected vehicle is not available at the departure time associated with the selected demand, modifying the departure time associated with the demand so that the selected vehicle is available at the modified departure time, and evaluating an effect of the modified departure time on the result function, the step of evaluating an effect of the modified departure time including evaluating load for the demand as a function of departure time;

(vii) repeating steps (v)-(vi) for a plurality of demands; and (viii) assigning the selected vehicle to the demand which yields the best value of the result function of the demands selected in steps (v)-(vii), and 8) modifying the list of vehicles and list of demands to indicate a revised state based on the use of vehicles and demands in step (7); and 9) repeating steps (6) through (8) so that steps (6) through (8) are performed for the plurality of demands and so that step (7) for each repetition is performed using the state resulting from step (8) for the immediately previous repetition.

* * * * *

UNITED STATES PATENT AND TRADEMARK OFFICE
CERTIFICATE OF CORRECTION

PATENT NO.        : 8,260,650 B2
APPLICATION NO.   : 11/709302
DATED             : September 4, 2012
INVENTOR(S)       : H. Roy Miller Page 1 of 1

It is certified that error appears in the above-identified patent and that said Letters Patent is hereby corrected as shown below:

In the Specification
    Column 1, line 36, "schedule of is" should read -- schedule is --.
    Column 2, line 52, "to selecting" should read -- to select --.
    Column 6, line 62, "being schedule" should read -- being scheduled --.
    Column 13, line 37, "used a" should read -- used as a --.
    Column 13, line 48, "be schedule" should read -- be scheduled --.
    Column 14, line 42, "associated flying" should read -- associated with flying --.
    Column 18, line 10, "if so what" should read -- if so, what --.
    Column 18, line 24, "combining an splitting" should read -- combining and splitting --.
    Column 21, line 16, "strategies can" should read -- strategies, can --.

In the Claims
    Column 24, line 7, "criteria includes" should read -- criteria include --.
    Column 25, line 16, "step of" should read -- steps of --.
    Column 28, line 15, "steps (i)(ii)" should read -- steps (i)-(ii) --.

Signed and Sealed this
Thirty-first Day of December, 2013

Margaret A. Focarino
*Commissioner for Patents of the United States Patent and Trademark Office*